United States Patent
Bourassa et al.

(10) Patent No.: US 11,001,326 B1
(45) Date of Patent: May 11, 2021

(54) CANOPY APPARATUS AND BICYCLE FORMED THEREWITH

(71) Applicants: Veronica Y. Bourassa, Glendale, AZ (US); Kenneth J. Bourassa, Glendale, AZ (US); James E. Grimes, Yorba Linda, CA (US)

(72) Inventors: Veronica Y. Bourassa, Glendale, AZ (US); Kenneth J. Bourassa, Glendale, AZ (US); James E. Grimes, Yorba Linda, CA (US)

(*) Notice: Subject to any disclaimer, the term of this patent is extended or adjusted under 35 U.S.C. 154(b) by 0 days.

(21) Appl. No.: 16/459,332

(22) Filed: Jul. 1, 2019

Related U.S. Application Data

(63) Continuation-in-part of application No. 16/054,519, filed on Aug. 3, 2018, now abandoned.

(60) Provisional application No. 62/542,185, filed on Aug. 7, 2017.

(51) Int. Cl.
| | |
|---|---|
| *E04H 15/58* | (2006.01) |
| *B62J 17/083* | (2020.01) |
| *B62J 50/25* | (2020.01) |
| *B62J 17/08* | (2020.01) |
| *B62J 99/00* | (2020.01) |
| *E04H 15/06* | (2006.01) |

(52) U.S. Cl.
CPC ............ *B62J 17/083* (2020.02); *B62J 17/08* (2013.01); *B62J 50/25* (2020.02); *E04H 15/58* (2013.01); *B62J 99/00* (2013.01); *E04H 15/06* (2013.01)

(58) Field of Classification Search
CPC .......... B62J 17/08; B62J 17/083; E04H 15/58
See application file for complete search history.

(56) References Cited

U.S. PATENT DOCUMENTS

| | | | | |
|---|---|---|---|---|
| 578,649 | A * | 3/1897 | Mass ...................... | A45B 11/00 135/88.04 |
| 603,916 | A * | 5/1898 | Metzger ................. | A45B 11/00 135/88.04 |
| 614,364 | A * | 11/1898 | Burnham ............... | A45B 11/00 135/88.04 |
| 617,096 | A * | 1/1899 | Harrison et al. ....... | A01K 97/10 248/514 |
| 2,641,770 | A * | 6/1953 | Chapin ................ | A61G 7/0005 4/597 |
| 4,045,077 | A * | 8/1977 | DeVone ................... | B62J 17/00 296/78.1 |

(Continued)

FOREIGN PATENT DOCUMENTS

| | | | | |
|---|---|---|---|---|
| DE | 651649 | C * | 10/1937 | ............. B62J 17/08 |
| DE | 19504887 | A1 * | 8/1996 | ............. B62J 17/08 |
| GB | 2480438 | A * | 11/2011 | ............... B62J 6/20 |

*Primary Examiner* — David R Dunn
*Assistant Examiner* — Danielle Jackson
(74) *Attorney, Agent, or Firm* — Parsons & Goltry, PLLC; Michael W. Goltry; Robert A. Parsons

(57) ABSTRACT

A canopy apparatus includes a support assembly extending from an attached bracket configured to be fixed to a bicycle to an attached canopy extending outwardly from the support assembly over the bracket for providing shade or shelter from the Sun and weather conditions, and a caution flag, or increasing the visibility of the canopy apparatus, depending downwardly from the canopy to an intermediate position of the support assembly between the bracket and the canopy. The support assembly includes a plurality of segments releasably secured with lock pins and compression couplings.

21 Claims, 25 Drawing Sheets

(56) References Cited

U.S. PATENT DOCUMENTS

| | | | | |
|---|---|---|---|---|
| 4,157,075 A * | 6/1979 | Kirvutza | ................. | B60Q 1/50 |
| | | | | 116/56 |
| 5,579,797 A * | 12/1996 | Rogers | .................... | B63B 17/02 |
| | | | | 135/90 |
| 5,975,614 A * | 11/1999 | McGrue | ................... | B62J 17/08 |
| | | | | 296/78.1 |
| 5,979,722 A * | 11/1999 | Gonzales | ................ | B62J 21/00 |
| | | | | 2/46 |
| 6,105,594 A * | 8/2000 | Diaz | ..................... | A45B 11/00 |
| | | | | 135/16 |
| 8,479,756 B1 * | 7/2013 | Tieskotter | ............... | B62J 17/08 |
| | | | | 135/88.03 |
| 8,907,779 B1 * | 12/2014 | Ross | ......................... | B62J 6/00 |
| | | | | 340/473 |
| 2010/0072232 A1 * | 3/2010 | Rider | ...................... | A45F 3/16 |
| | | | | 222/610 |
| 2019/0037983 A1 * | 2/2019 | Bourassa | .............. | A45B 11/00 |

\* cited by examiner

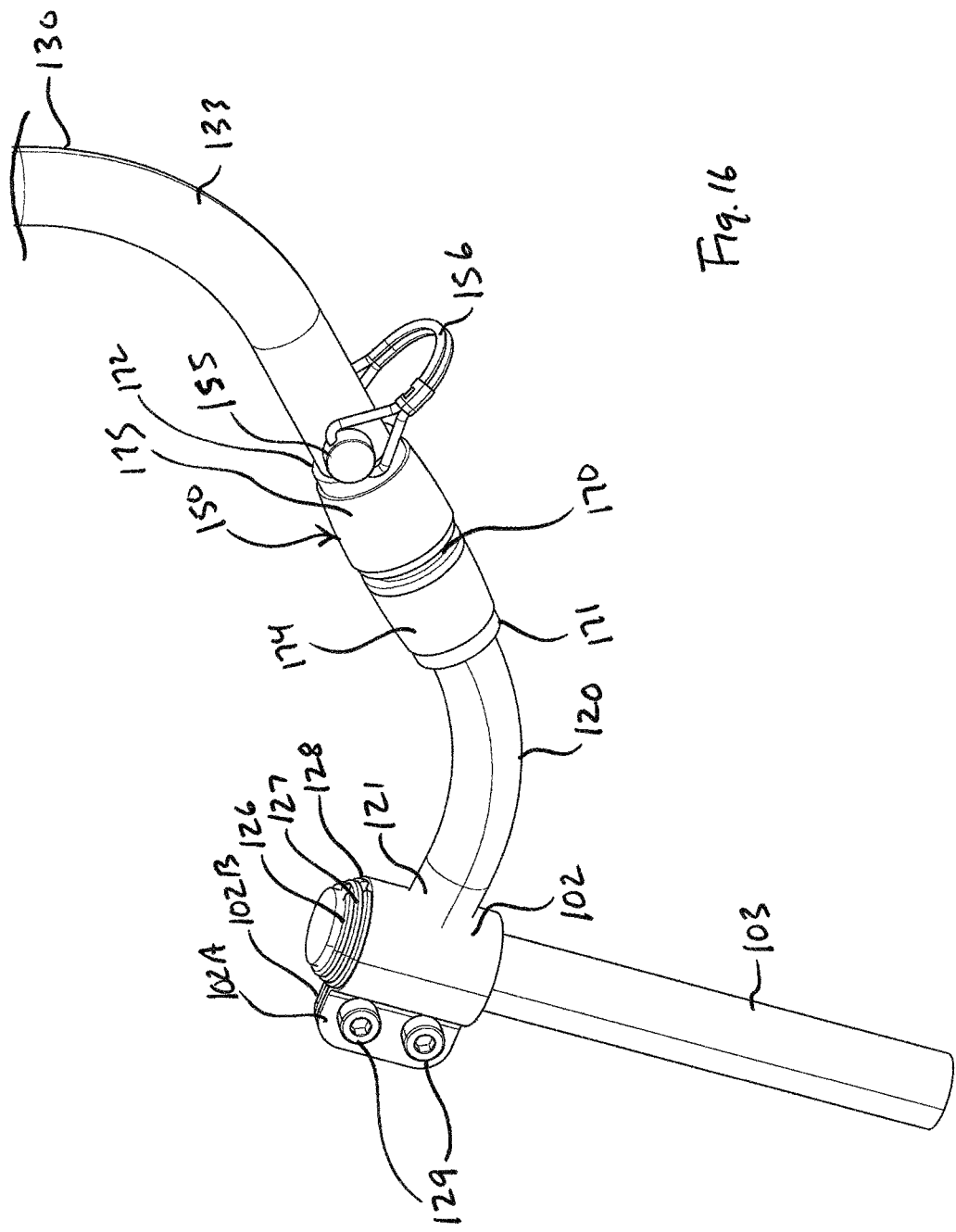

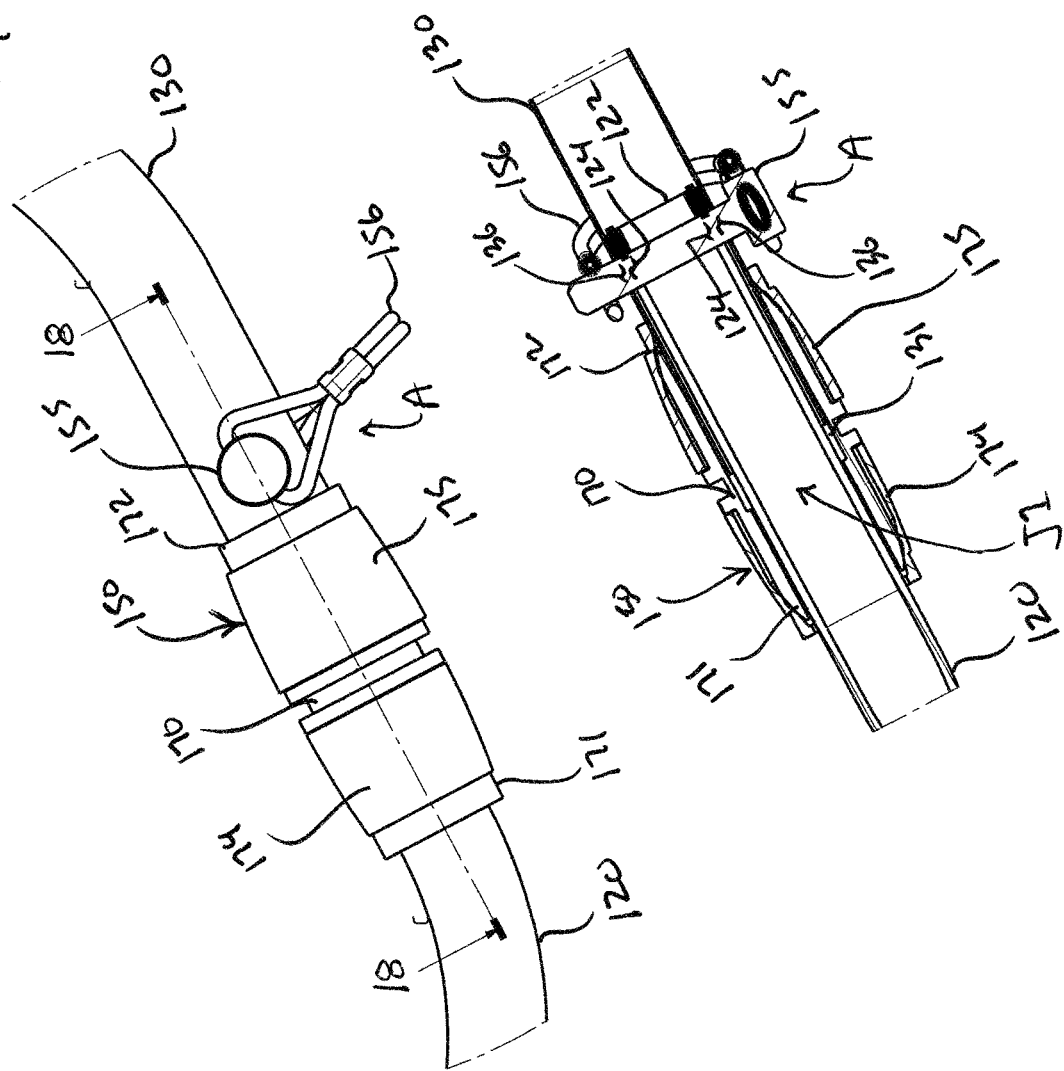

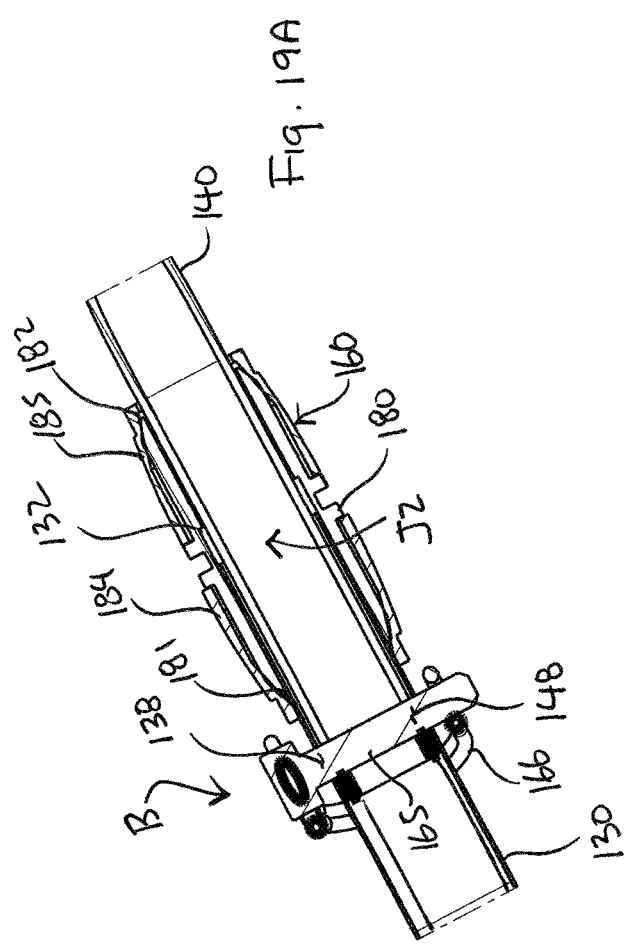

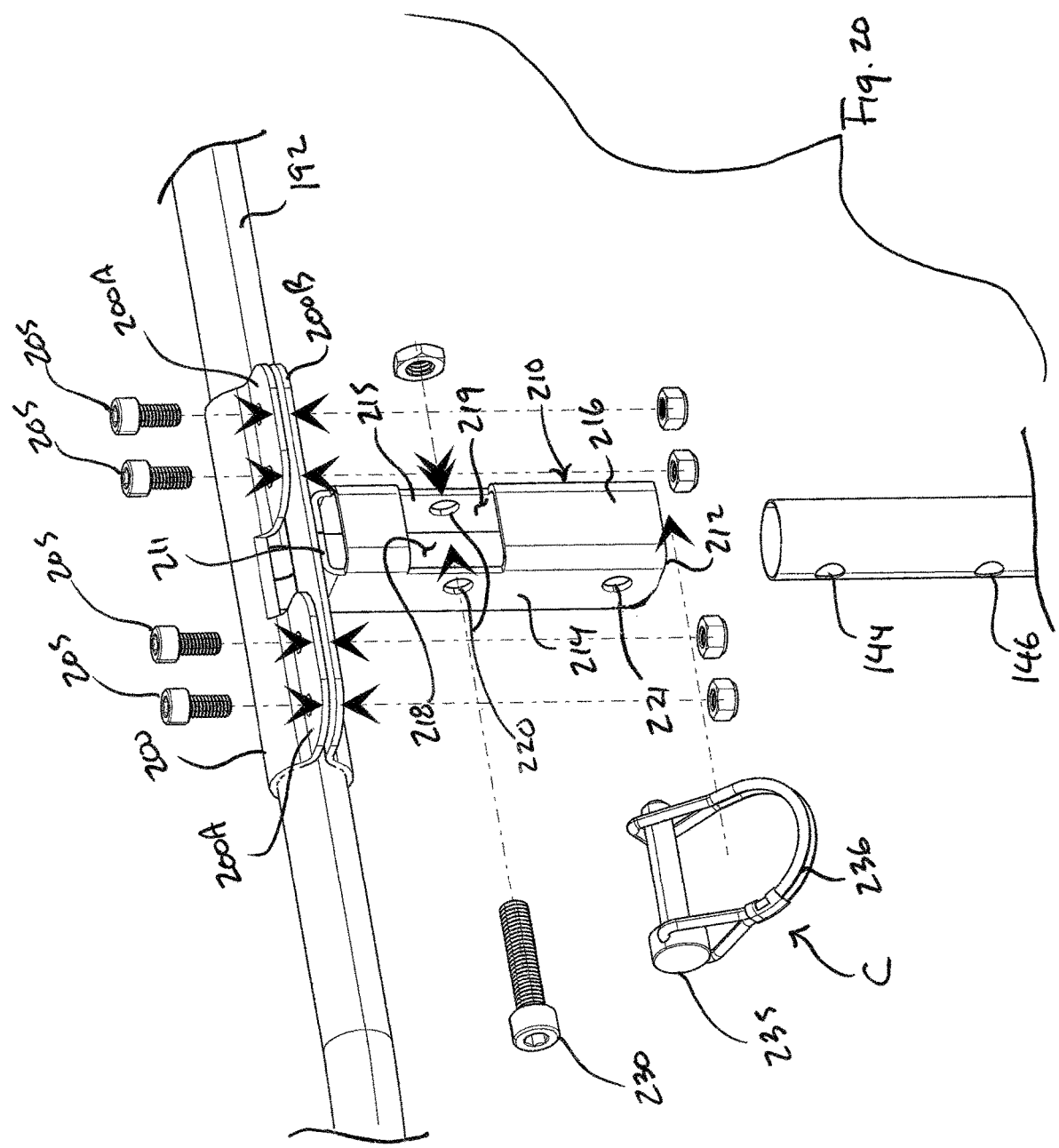

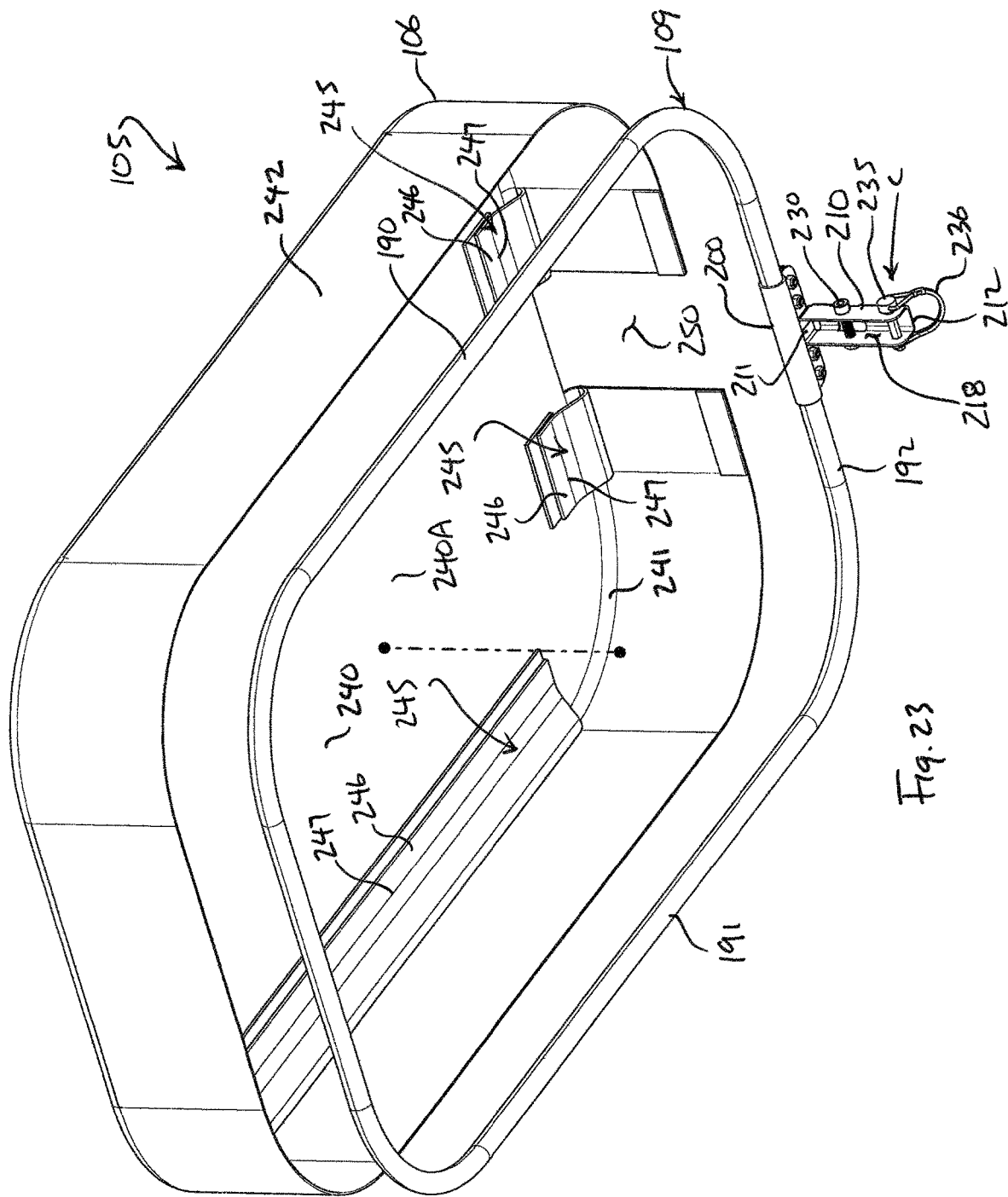

CANOPY APPARATUS AND BICYCLE FORMED THEREWITH

CROSS-REFERENCE TO RELATED APPLICATION

This application is a continuation-in-part of U.S. Non-Provisional patent application Ser. No. 16/054,519, filed Aug. 3, 2018, which claims the benefit of U.S. Provisional Patent Application No. 62/542,185, filed Aug. 7, 2017, the entire contents of which are incorporated herein by reference.

FIELD OF THE INVENTION

The present invention generally relates to canopies and, more particularly, to canopies configured to be attached to a bicycle for shading or sheltering a rider riding the bicycle from the Sun and weather conditions.

BACKGROUND OF THE INVENTION

People have become increasingly concerned about protecting themselves from the Sun's inherently harmful ultraviolet light. At the same time, more people are spending time outdoors enjoying a variety of outdoor activities to promote an active and healthy lifestyle. One of the most popular recreational activities is bicycling.

Cycling has gained in popularity as a fun sport for adults and kids all over the world. In addition to being pleasurable, cycling even short durations can improve and boost metabolism, promote weight loss, balance, and coordination, strengthen the muscles, and prevent the risk of heart disease. In addition, many people now use bicycling as a means of transportation, whether by necessity or choice.

Although bicycling is a popular recreational activity and for some a regular means of transportation, bicycling inherently exposes riders to the Sun's harmful ultraviolet rays in addition to inclement weather conditions. Although skilled artisans have developed a variety of shade structures useful with bicycles, needed is yet another that is easy to install, adjust, that is collapsible for being stored during periods of non-use, and that inexpensive, and that is made to be highly visible for safety purposes.

SUMMARY OF THE INVENTION

According to the principle of the invention, a canopy apparatus includes a support assembly extending from an attached bracket configured to be fixed to a bicycle to an attached canopy extending outwardly from the support assembly over the bracket for providing shade or shelter from the Sun and weather conditions, and a caution flag, configured to increase the visibility of the canopy apparatus, depending downwardly from the canopy to an intermediate position of the support assembly between the bracket and the canopy. The support assembly includes a lower segment, an upper segment, and an intermediate segment therebetween connected releasably to both the lower segment and the upper segment, wherein the lower segment extends outwardly from the bracket to the intermediate segment, the intermediate segment extends outwardly from the lower segment and upwardly to the upper segment, and the upper segment extends upwardly from the intermediate segment to the canopy. The caution flag depends downwardly from the canopy to an intermediate position of the intermediate segment between the lower segment and the upper segment. The lower segment and the intermediate segment are joined telescopingly forming a telescoped joint, a retention assembly releasably connects the lower segment to the intermediate segment disabling the lower segment and the intermediate segment from telescoping relative to one another, and a compression coupling concurrently circumscribes and secures the telescoped joint from the lower segment to the intermediate segment. The retention assembly includes a lock pin received by corresponding holes in the lower segment and the intermediate segment. The intermediate segment and the upper segment are joined telescopingly forming a telescoped joint, a retention assembly releasably connects the intermediate segment to the upper segment disabling the intermediate segment and the upper segment from telescoping relative to one another, and a compression coupling concurrently circumscribes and secures the telescoped joint from the intermediate segment to the upper segment. The retention assembly of the intermediate and upper segments is a lock pin received by corresponding holes in the intermediate segment and the upper segment. The canopy is mounted to the support assembly for movement between a stowage position juxtaposed with the support assembly and an operative position extending outwardly from the support assembly over the bracket for providing shade or shelter from weather conditions. A canopy retention assembly is configured to retain the canopy in the operative position. The canopy retention assembly includes a lock pin received by corresponding holes in the support assembly and a support member of the canopy. The support member of the canopy interacts with the support assembly when the canopy is in the operative position thereby disabling the canopy from moving beyond the operative position. The support member of the canopy is mounted to the support assembly for movement of the canopy between the stowage position and the operative position. The bracket is configured to be fixed to a seat post of a bicycle, and additionally comprising at least one seat post shim configured to be positioned between the seat post of the bicycle and the bracket.

According to the principle of the invention, a canopy apparatus includes a support assembly including a lower segment, an upper segment, and an intermediate segment therebetween connected releasably to both the lower segment and the upper segment, the lower segment extends outwardly from an attached bracket configured to be fixed to a bicycle to the intermediate segment, wherein the intermediate segment extends outwardly from the lower segment and upwardly to the upper segment, and the upper segment extends upwardly from the intermediate segment to an attached canopy over the bracket for providing shade or shelter from the Sun and weather conditions. The lower segment and the intermediate segment are joined telescopingly forming a first telescoped joint. The intermediate segment and the upper segment are joined telescopingly forming a second telescoped joint. A first retention assembly releasably connects the lower segment to the intermediate segment disabling the lower segment and the intermediate segment from telescoping relative to one another. A second retention assembly releasably connects the intermediate segment to the upper segment disabling the intermediate segment and the upper segment from telescoping relative to one another. A first compression coupling concurrently circumscribes and secures the first telescoped joint from the lower segment to the intermediate segment. A second compression coupling concurrently circumscribes and secures the second telescoped joint from the intermediate segment to the upper segment. The first retention assembly is a lock pin received by corresponding holes in the lower segment and the intermediate segment. The second retention assembly is a lock pin received by corresponding holes in the intermediate segment and the upper segment. The canopy is mounted to the upper segment for movement between a stowage position juxtaposed with the support assembly and an operative position extending outwardly from the support assembly over the bracket for providing shade or shelter from weather conditions. A third retention assembly is configured to retain the canopy in the operative position. The third retention assembly is a lock pin received by corresponding holes in the upper segment and a support member of the canopy. The support member of the canopy interacts with the upper segment when the canopy is in the operative position thereby disabling the canopy from moving beyond the operative position. The support member of the canopy is mounted to the upper segment for movement of the canopy between the stowage position and the operative position. A caution flag is coupled between the canopy and the intermediate segment, and depends downwardly from the canopy to an intermediate position of the intermediate segment between the lower segment and the upper segment. The bracket is configured to be fixed to a seat post of a bicycle, and at least one seat post shim is configured to be positioned between the seat post of the bicycle and the bracket.

BRIEF DESCRIPTION OF THE DRAWINGS

Referring to the drawings:

FIG. 16 is a view corresponding to FIG. 15 illustrating the assembly of the lower segment, the lower compression coupling, the intermediate segment, and the lock pin;

FIG. 17 is a side elevation view corresponding to FIG. 16 illustrating the assembly of the lower segment, the lower compression coupling, the intermediate segment, and the lock pin;

FIG. 18 is a section view taken along line 18-18 of FIG. 17;

FIG. 19A is a section view taken along line 19A-19A of FIG. 19;

FIG. 20 is an enlarged, fragmentary, partially exploded perspective view of the bracket assembly of canopy frame and the upper end of the upper segment withdrawn from the support member of the bracket assembly corresponding to FIG. 11;

FIG. 23 is a perspective view of the canopy cover of FIG. 9 shown as it would appear detached from the canopy frame of FIG. 11;

FIG. 24 is a perspective view corresponding to FIG. 23 illustrating the canopy cover and the canopy frame assembled thereby forming the canopy;

DETAILED DESCRIPTION

As cyclists ourselves, we appreciate the pros and cons of the activity. We appreciate the fun of exploring on our bicycles, but can get overheated in the Sun. After a particularly hot bicycle ride, we started sketching drawings of what a Sun shade should be. We tested prototypes. One we liked unfortunately twisted in use, so we continued to invent. Our current model is sturdier but even simpler and more efficient to manufacture.

Figure 1:
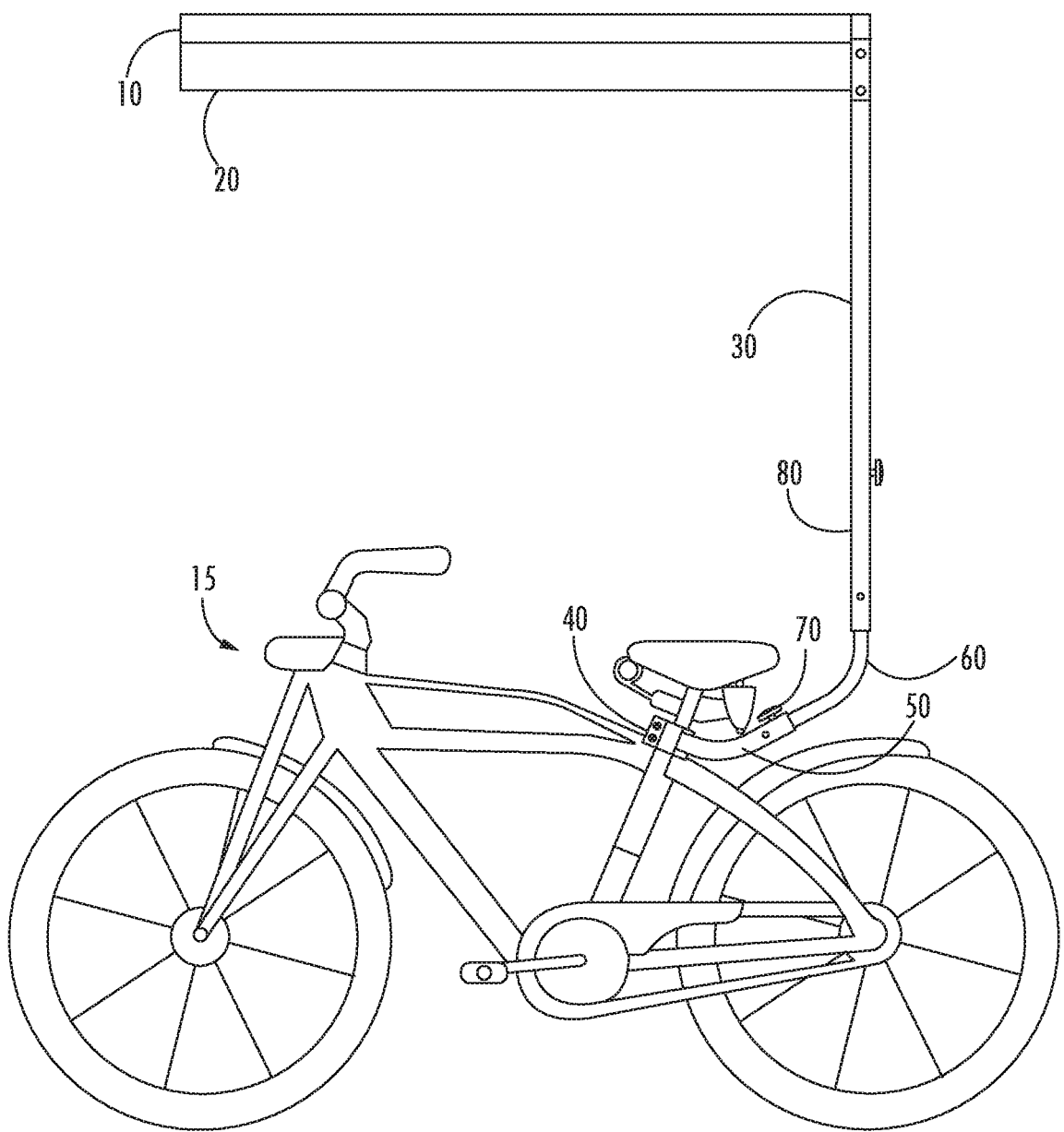
FIG. 1 is a side elevation view of canopy apparatus fixed to a bicycle, the canopy apparatus including a support assembly extending from an attached bracket fixed to a seat post of the bicycle to an attached canopy extending outwardly from the support assembly at an elevated location over the bracket and a seat fixed to the seat post for shading or sheltering a rider of the bicycle from the Sun and weather conditions, the support assembly including a lower segment, an upper segment, and an intermediate segment therebetween connected releasably to both the lower segment and the upper segment, the lower segment extending outwardly from the attached bracket to the intermediate segment, the intermediate segment extending outwardly from the lower segment and upwardly to the upper segment, and the upper segment extending upwardly from the intermediate segment to the attached canopy.

In this embodiment, we disclose a foldable canopy apparatus 10 on a standard bicycle 15 in FIG. 1. Here a valance 20 is shown as edging the canopy apparatus 10. A single telescoping rod 30 supports the canopy apparatus 10 and attaches it to the bicycle seat post via bracket 40. Because seat posts are variable in diameter, different inserts or shims are available for effectively clamping to the seat post.

The telescoping rod 30 includes at least three parts, including lower segment or arm 50, intermediate segment or curved tube 60, and upper segment or support pole 80. Arm 50 connects to bracket 40. It is intended to remain on the bicycle bracket 40 between uses of the canopy apparatus 10. Arm 50 does not extend much if at all behind the bicycle seat. The curve of this arm is designed to support the shade behind the seat and avoid encroaching on the rider or the rider's buttocks. In this embodiment, the arm 50 has two holes, one for a pin (not shown) to fix curved tube 60 inside the arm 50. Thumb nut 70 enables tightening the arm 50 curved tube 60 together to avoid movement, including rattling.

Curved tube 60 fits inside support pole 80 that can be raised or lowered about a foot to adjust to the rider's height. After the height (three feet to four feet) is selected, a pin is inserted into a hole in support pole 80 and the height is fine-tuned until the pin slips into an adjacent hole in the curved tube 60. This is the junction of curved tube 60 and support pole 80.

Figure 2:
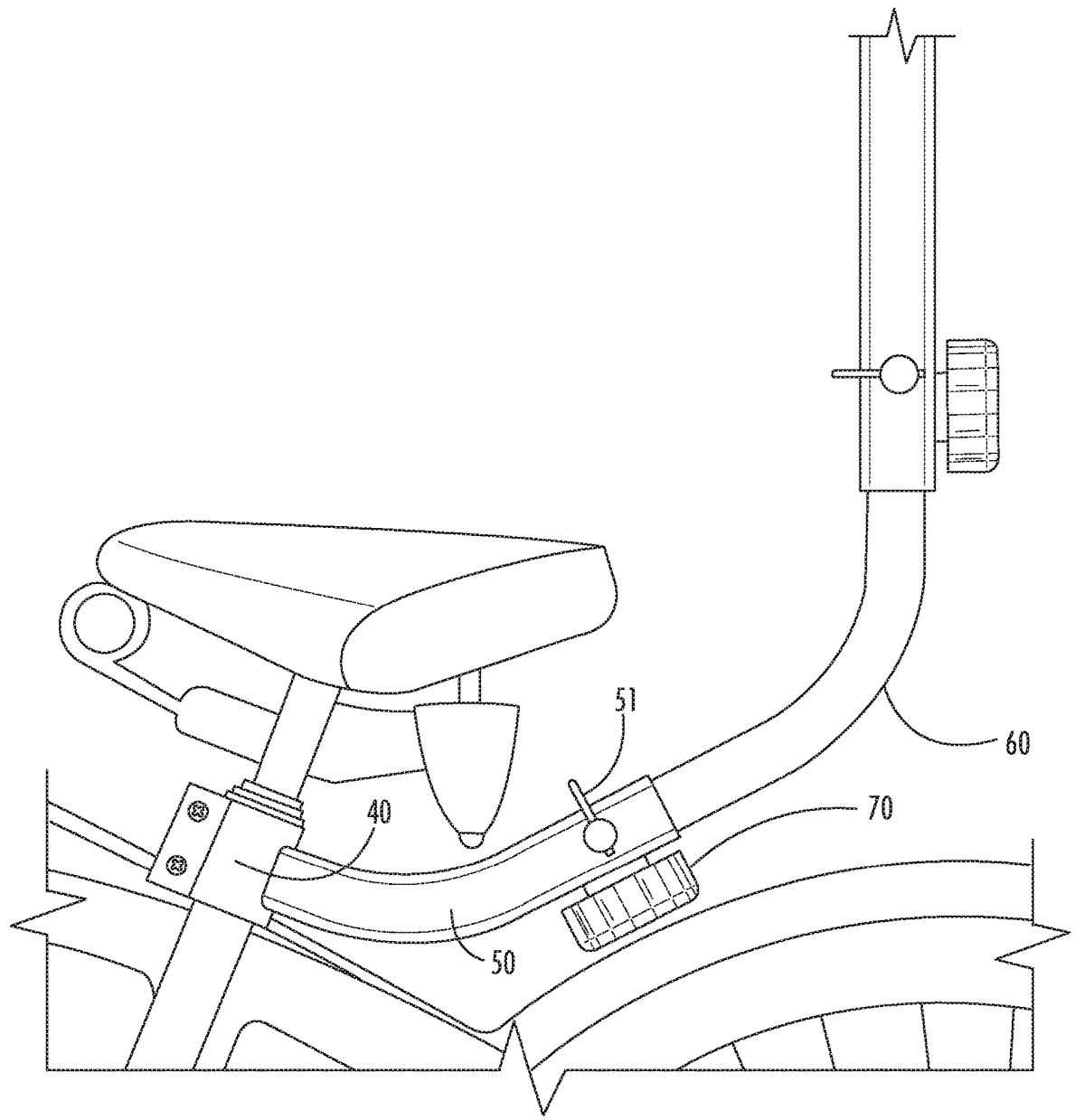
FIG. 2 is an enlarged fragmentary view corresponding to FIG. 1 illustrating the bracket fixed to the seat post, the lower segment extending outwardly from the attached bracket to the intermediate segment, and the intermediate segment extending outwardly from the lower segment and upwardly to the upper segment.

FIG. 2 is a more detailed view of the bracket 40 that fastens the canopy apparatus 10 to the bicycle 15. This shows a pin 51 in arm 50 that fixes the curved tube 60. Optionally a thumb screw 70 helps stabilize the curved tube 60 inside the arm 50. The head of the thumb screw 70 is enlarged for purposes of illustration. Curved tube 60 can be variably inserted into the arm 50, for a telescoping function. Not show are multiple holes in the curved tube 60 that permit adjustable length.

Figure 3:
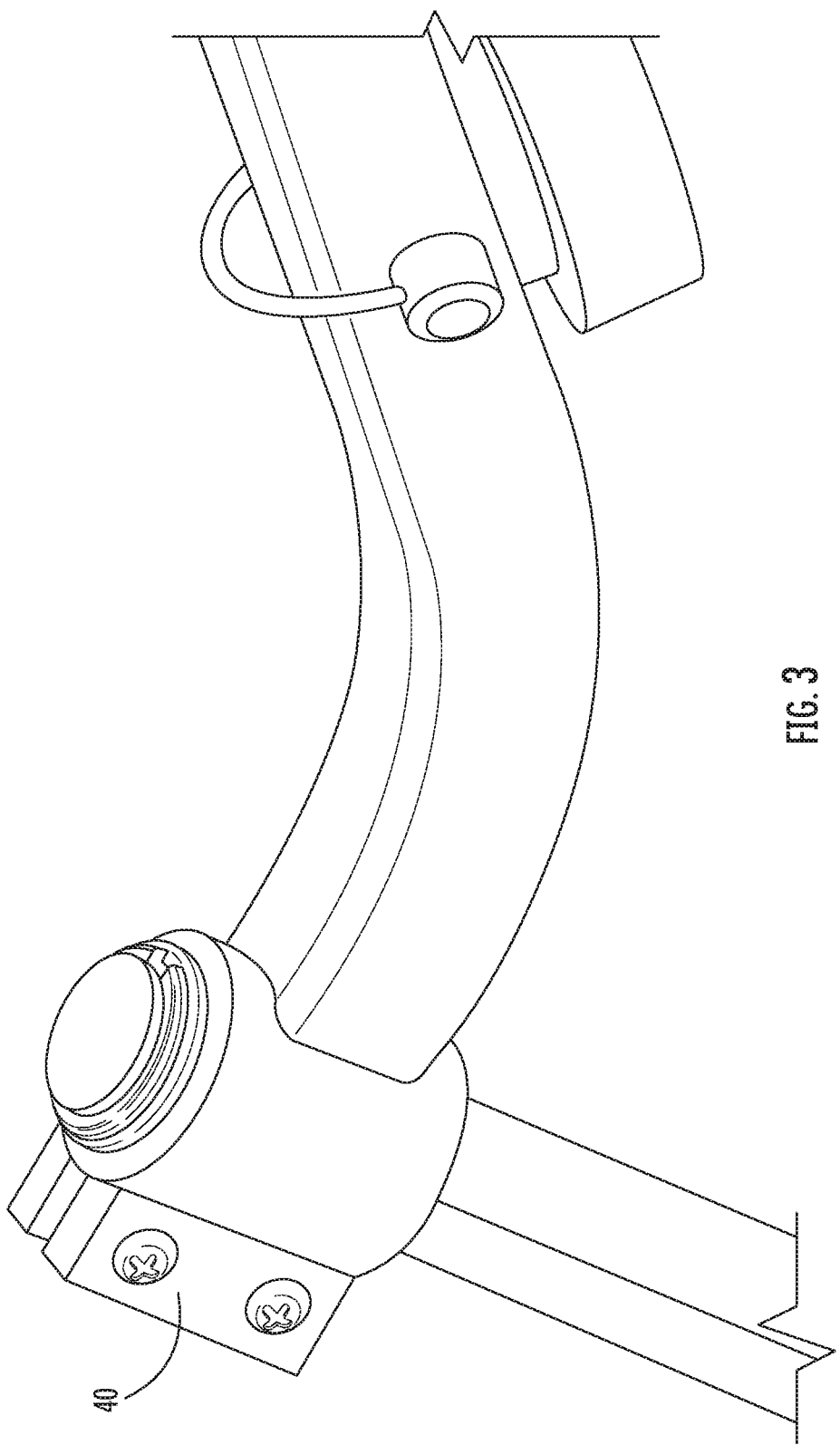
FIG. 3 is an enlarged fragmentary view corresponding to FIGS. 1 and 2 illustrating the bracket fixed to the seat post.

FIG. 3 shows the bracket 40 which can be adjusted with seat post inserts or shims. The inserts permit adjusting the bracket to adapt the canopy apparatus 10 to many styles of bicycles.

Figure 4:
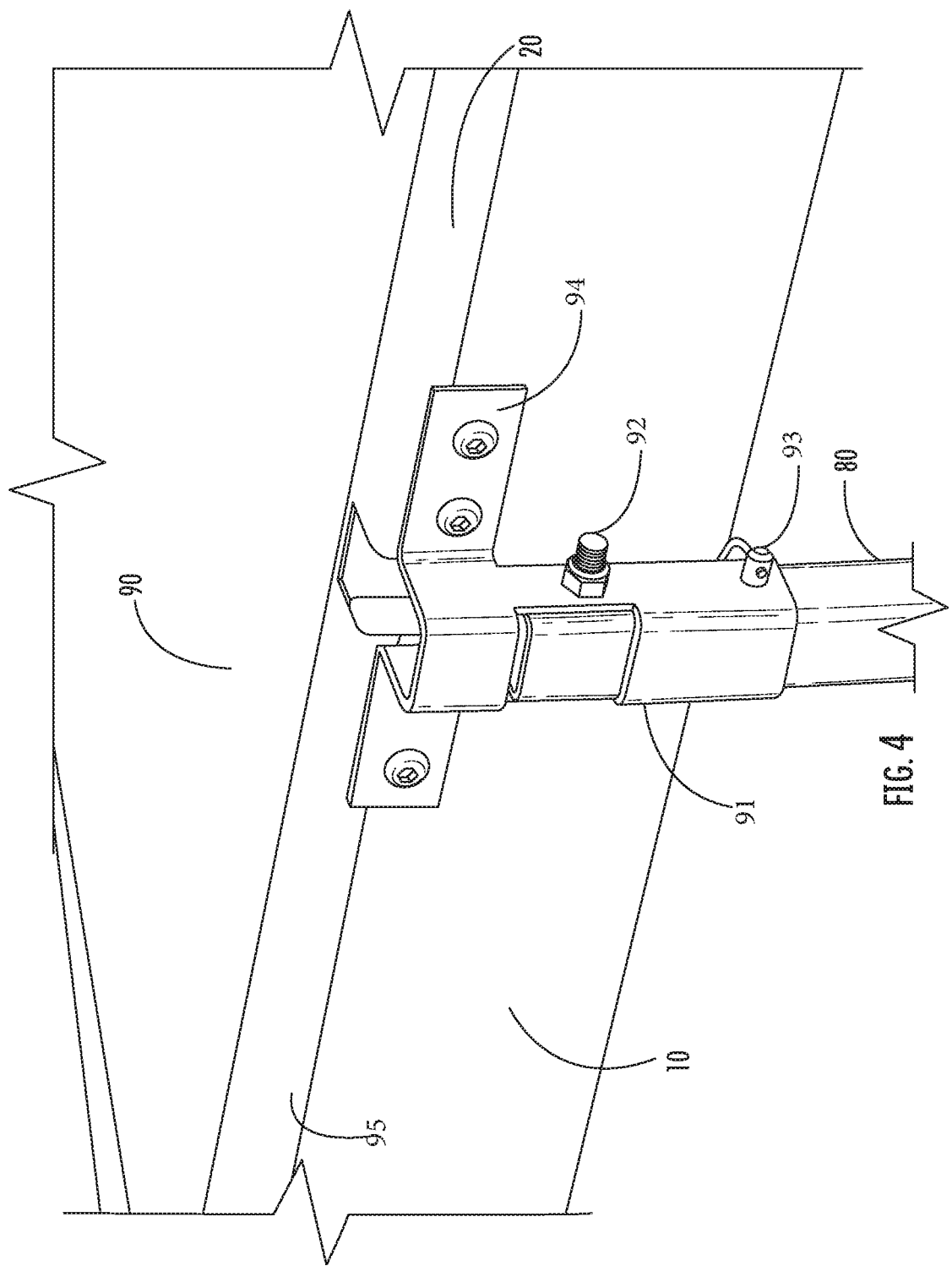
FIG. 4 is an enlarged fragmentary view illustrating an upper end of the upper segment attached to a support member of a frame of the canopy.

FIG. 4 illustrates the rear of the assembled canopy apparatus 10 and illustrates one-way canopy apparatus 10 can be folded. The screen 90 sits atop support pole 80 and is connected to the pole 80 via a support member or tipping mechanism 91 which is shown connected permanently to the support pole 80 with a bolt 92, on which the screen 90 pivots. The weight of the screen 90 would pivot the tipping mechanism 92 without a pin 93 to keep it upright. The top of the tipping mechanism 91 has a plate 94 that can be screwed to a corresponding plate (not shown) supporting the screen 90. FIG. 4 also shows the screen 90, a valance 20 and optional trim 95 that can include batting, foam or other soft material to cushion upon contact.

Figure 5:
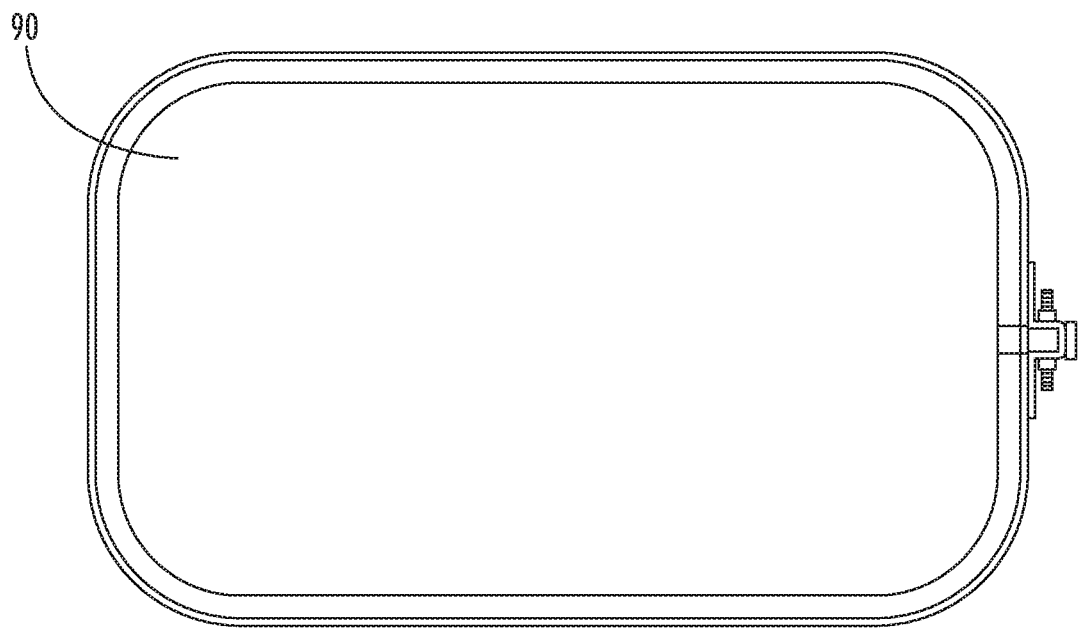
FIG. 5 is a top plan view of the embodiment of FIG. 1.

FIG. 5 shows an upper view of the screen 90 with attachment to the tipping mechanism 91. From end to end (tipping apparatus) the screen measures 39 inches. The screen is 24 inches from side to side. The screen 90 is preferably supported by a narrow cylinder with rounded corners.

Figure 6:
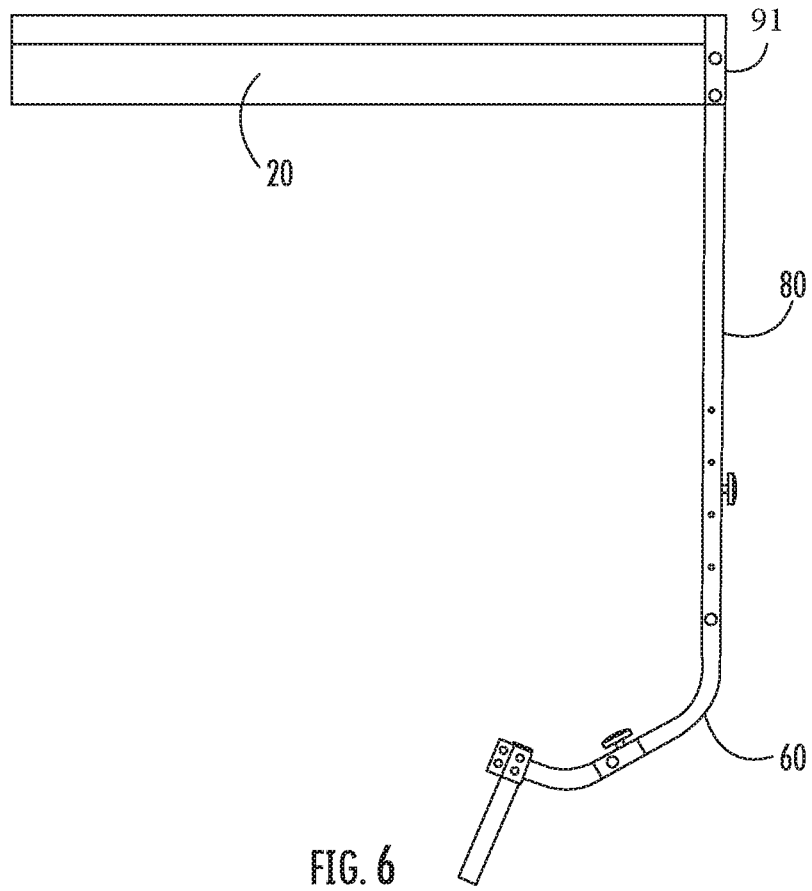
FIG. 6 is a side elevation view of hardware of the canopy apparatus first illustrated in FIG. 1.

FIG. 6 is a schematic of the support system for the canopy apparatus 10. This shows the tipping mechanism 91 is preferably about 4¾ inches. The support pole 80 is about 34½ inches. The curved tube 60 has a straight section of about 27 inches. The support pole 80 can be slid upward about 12 inches, to still leave about 15 inches of the curved tube 60 inside.

Figure 7:
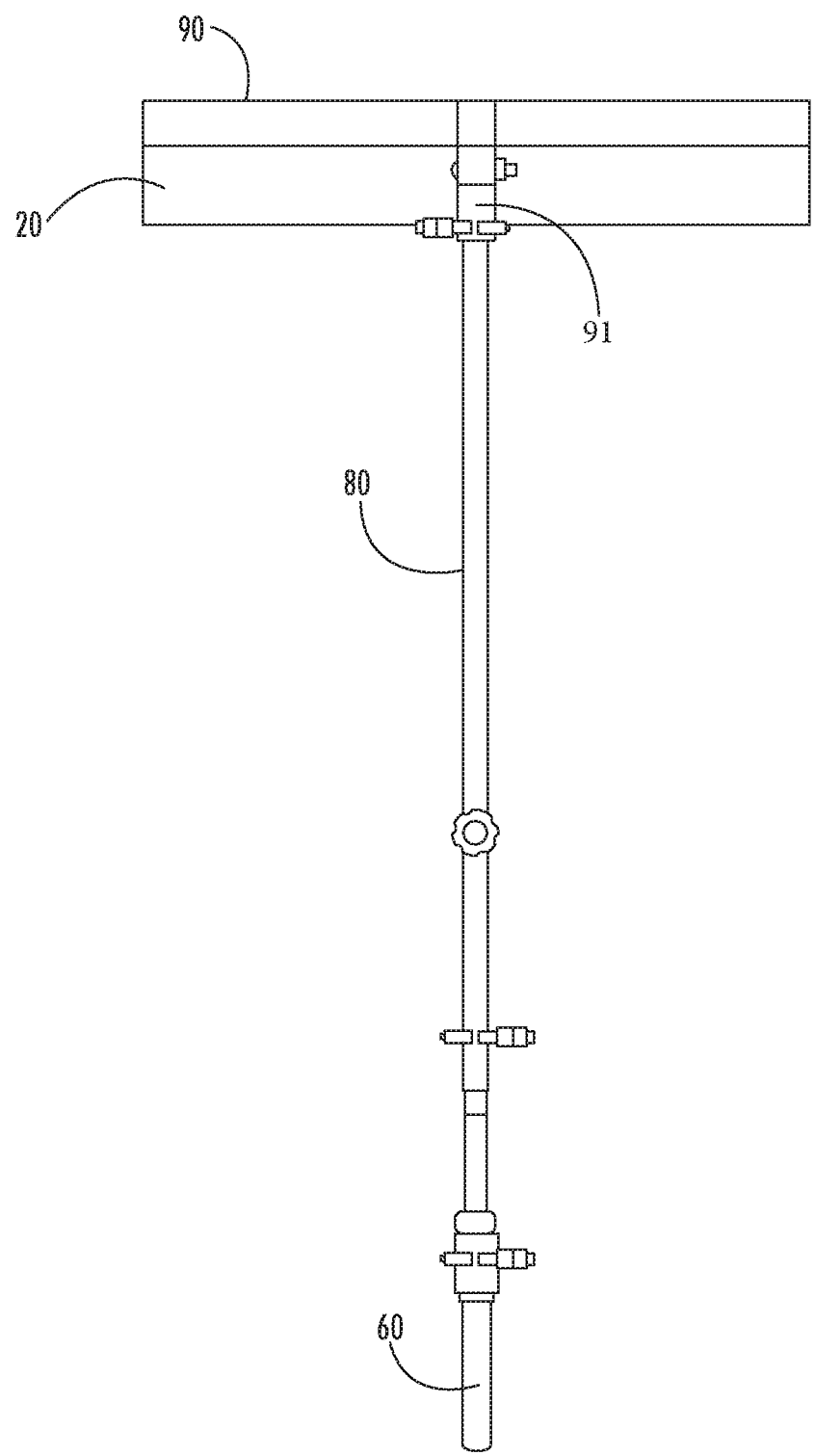
FIG. 7 is a rear elevation view of the embodiment of FIG. 6.

FIG. 7 is a rear plan view of the straight part of the hardware of the canopy apparatus 10. At the bottom is the curved tube 60. In the middle is the support pole, and at the top connecting the support pole 80 with the screen 90 is the tipping mechanism 91.

The individual metal parts are preferably machined or molded and can include but are not limited to steel, aluminum and polyvinyl chloride (PVC). Preferred for the rods is extruded aluminum.

The screen is preferably made of a plastic mesh, which may be extruded, oriented, expanded, woven or tubular. The mesh can be made from polypropylene, polyethylene, PVC, PTFE. polyester, nylon or cotton mesh, or a combination thereof. For added strength, metallic threads can be uses therein. The mesh is chosen based on Sun blockage and air transmission. Alternatively, when air transmission is not a factor, a wide variety of strong fabrics can be used as screens, including but not limited to canvas, cotton, polyester, wool, viscose and silk.

The valance and trim cover can be the same material as the screen. Alternately, the valance can be made of a variety of fabrics that let air through and decrease drag and include but are not limited to lace, eyelet and pointelle materials. Such are chosen for their appearance and air passage.

The canopy apparatus 10 is assembled by starting with removing the bicycle seat and determining which bracket to use on the seat post. The bracket is tightened around the seat post and the bicycle seat re-installed. The curved tube is inserted into the bracket and arm. The screen portion is attached to the tipping mechanism. The support pole is placed over the curved tube and adjusted for height and the pin is inserted. Optional thumb screws are tightened.

Figure 8:
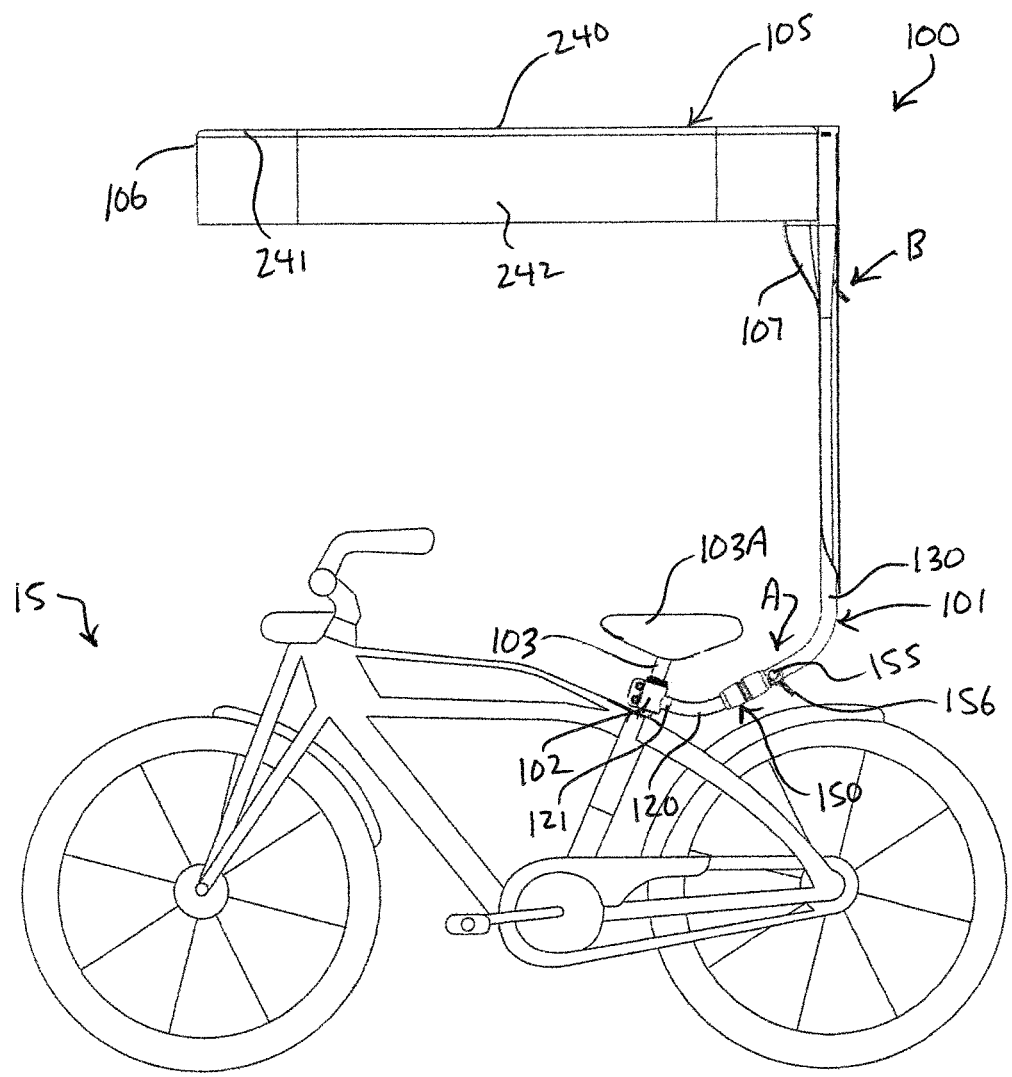
FIG. 8 is a side elevation view of an alternate embodiment of a canopy apparatus including a support assembly extending from an attached bracket fixed to a bicycle seat post of a bicycle to an attached canopy extending outwardly from the support assembly at an elevated location over the bracket for shading or sheltering a rider of a bicycle from the Sun and weather conditions by a canopy cover of the canopy, and a caution flag depending downwardly from the canopy to an intermediate position of the support assembly between the bracket and the canopy.

Attention is now directed to FIG. 8 in which there is illustrated an alternate embodiment of a canopy apparatus 100 including support assembly 101 extending rearwardly from attached bracket 102 fixed to bicycle seat post 103 of the previously-described bicycle 15 and upwardly to attached canopy 105 extending outwardly in a forwardly direction from support assembly 101 at an elevated location over bicycle 15 and bracket 102 and seat 103A carried by seat post 103 for shading or sheltering a rider of bicycle 15 from the Sun and weather conditions by a canopy cover 106 of canopy 105. Caution flag 107 at the rear of canopy apparatus 100 depends downwardly from canopy 105 along support assembly 101 to an intermediate position of support assembly 101 between bracket 102 and canopy 105. Importantly, caution flag 107 is configured to increase the visibility of canopy apparatus 100 and, thus, of the rider riding bicycle 15 incorporating canopy apparatus 100 for safety purposes.

Support assembly 101 extends from attached bracket 102 fixed to bicycle seat post 103 outwardly to the rear of seat post 103 under seat 103A and upwardly behind seat 103A to attached forwardly-extending canopy 105 thereby disabling support assembly 101 from encroaching on the rider or the rider's buttocks or otherwise interfering with the ability of a rider to ride bicycle 15 in a customary and ordinary manner. Support assembly 101 supports canopy 105, which extends forwardly from support assembly 101 at the elevated location over bicycle 15 and bracket 102 and seat 103A carried by seat post 103 for, again, shading or sheltering a rider of bicycle 15 from the Sun and weather conditions by canopy cover 106 of canopy 105.

Figure 9:
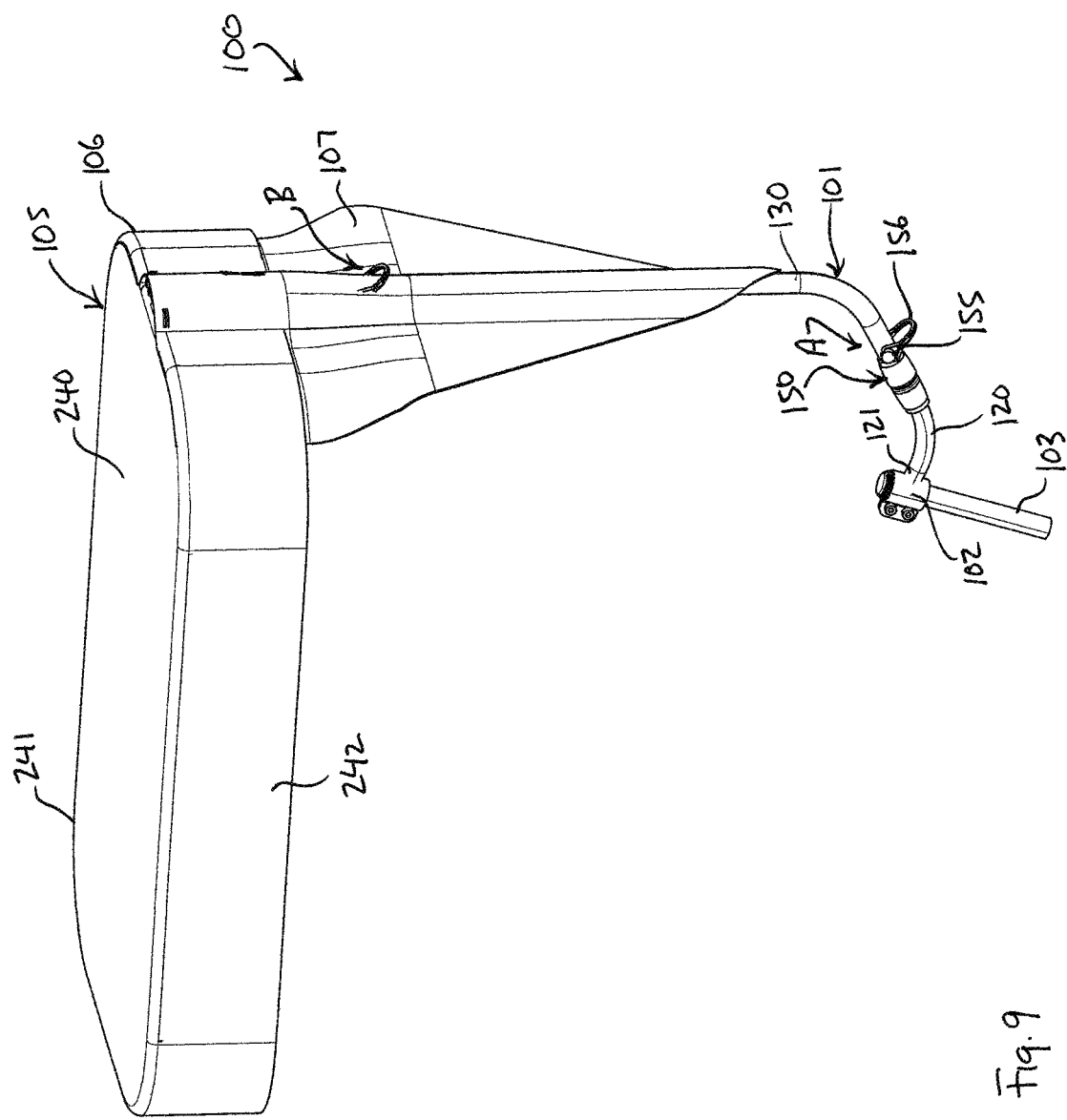
FIG. 9 is an enlarged perspective view of the canopy apparatus of FIG. 8 shown with the bracket fixed to the bicycle seat post.
Figure 10:
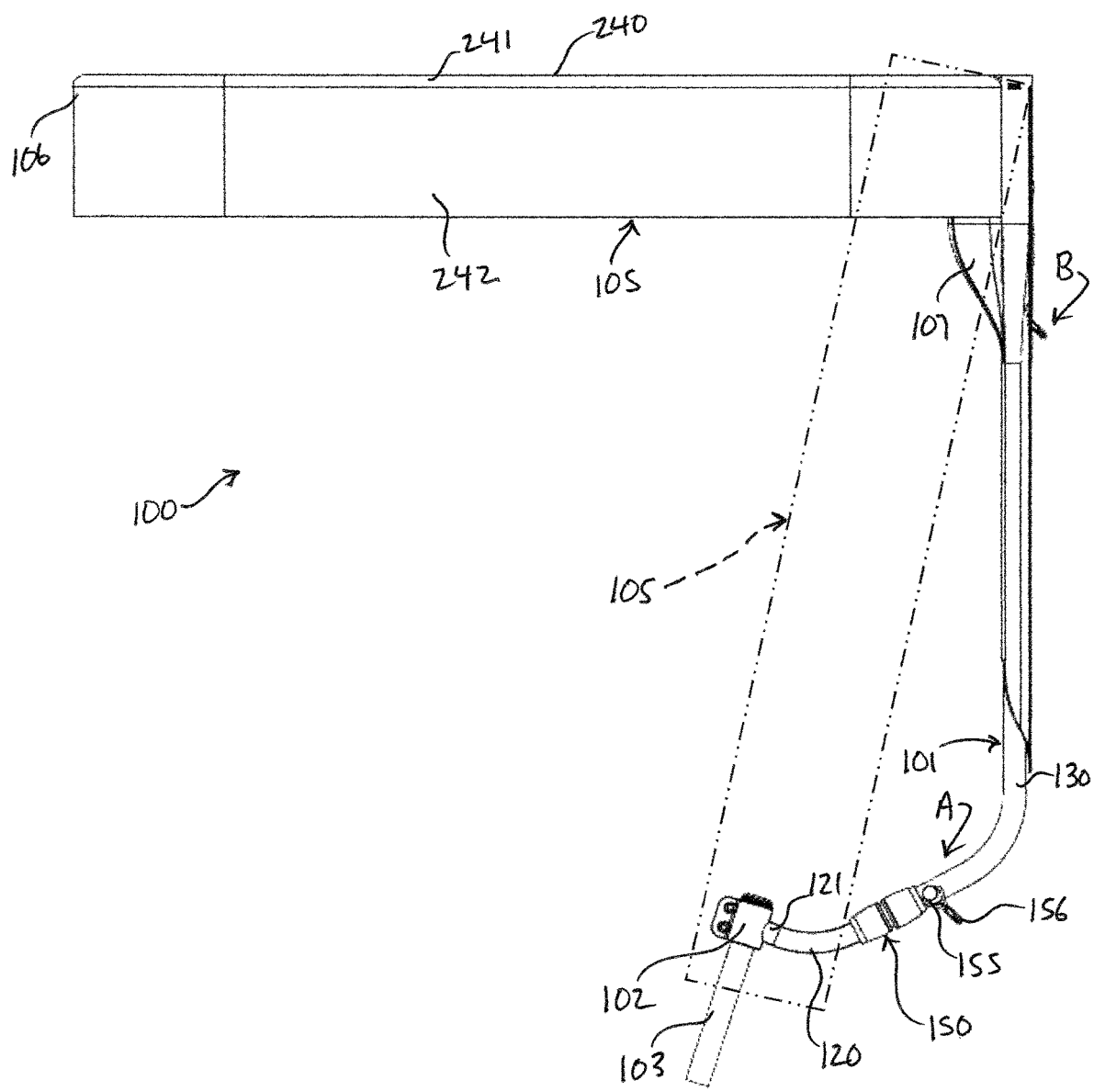
FIG. 10 is a side elevation view of the embodiment of FIG. 9.
Figure 11:
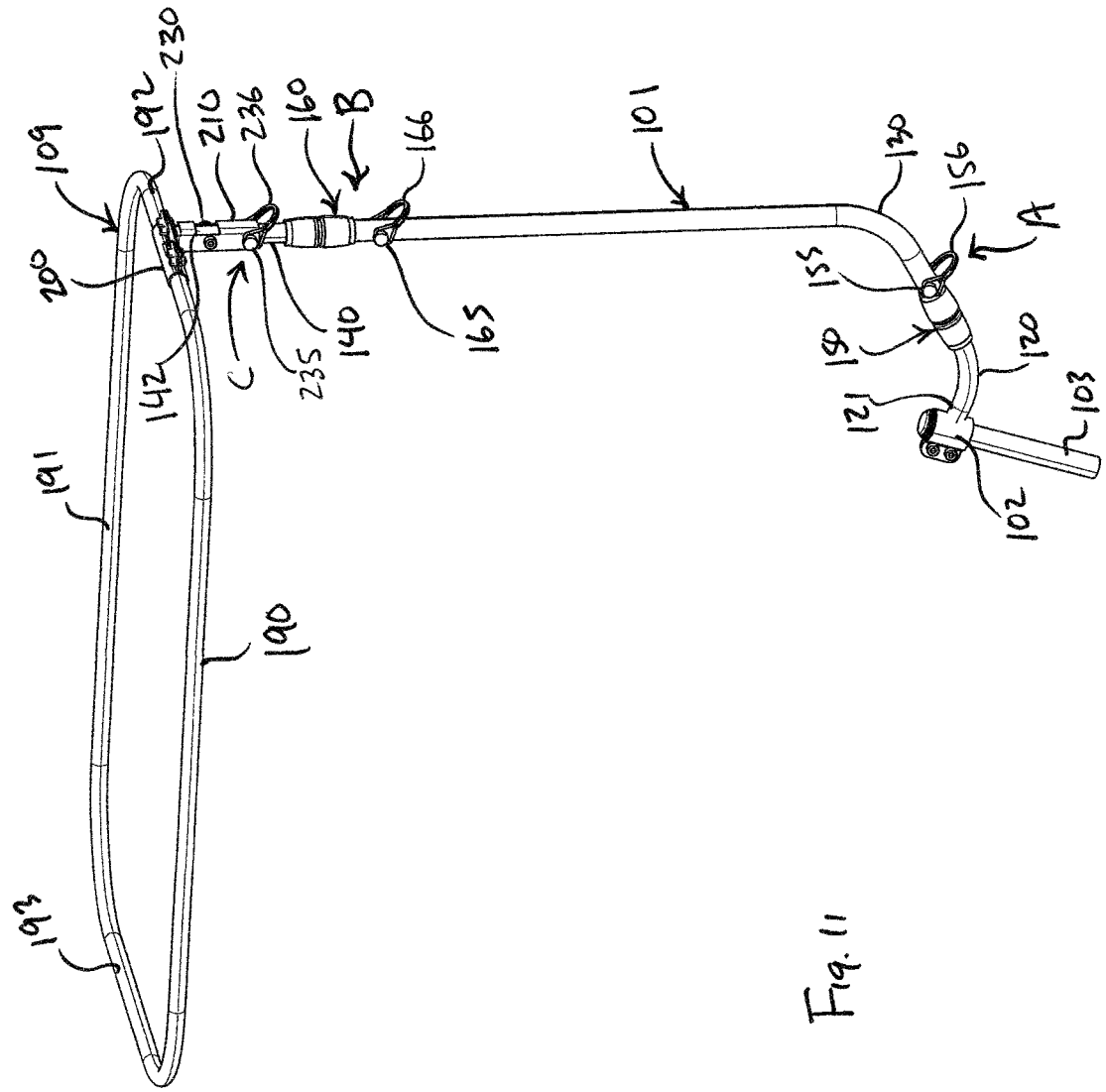
FIG. 11 is a perspective view of the embodiment of FIG. 9 shown without the canopy cover of the canopy and the caution flag to better illustrate the support assembly and a canopy frame of the canopy, the support assembly including a lower segment, an upper segment, and an intermediate segment therebetween connected releasably to both the lower segment and the upper segment, the lower segment extending outwardly from the attached bracket to the intermediate segment, the intermediate segment extending outwardly from the lower segment and upwardly to the upper segment, the upper segment extending upwardly from the intermediate segment to an upper end attached to a support member of a bracket assembly of the canopy frame, a lower compression coupling and a lower lock pin securing the lower and intermediate segments, and an upper compression coupling and an upper lock pin securing the intermediate and upper segments.
Figure 12:
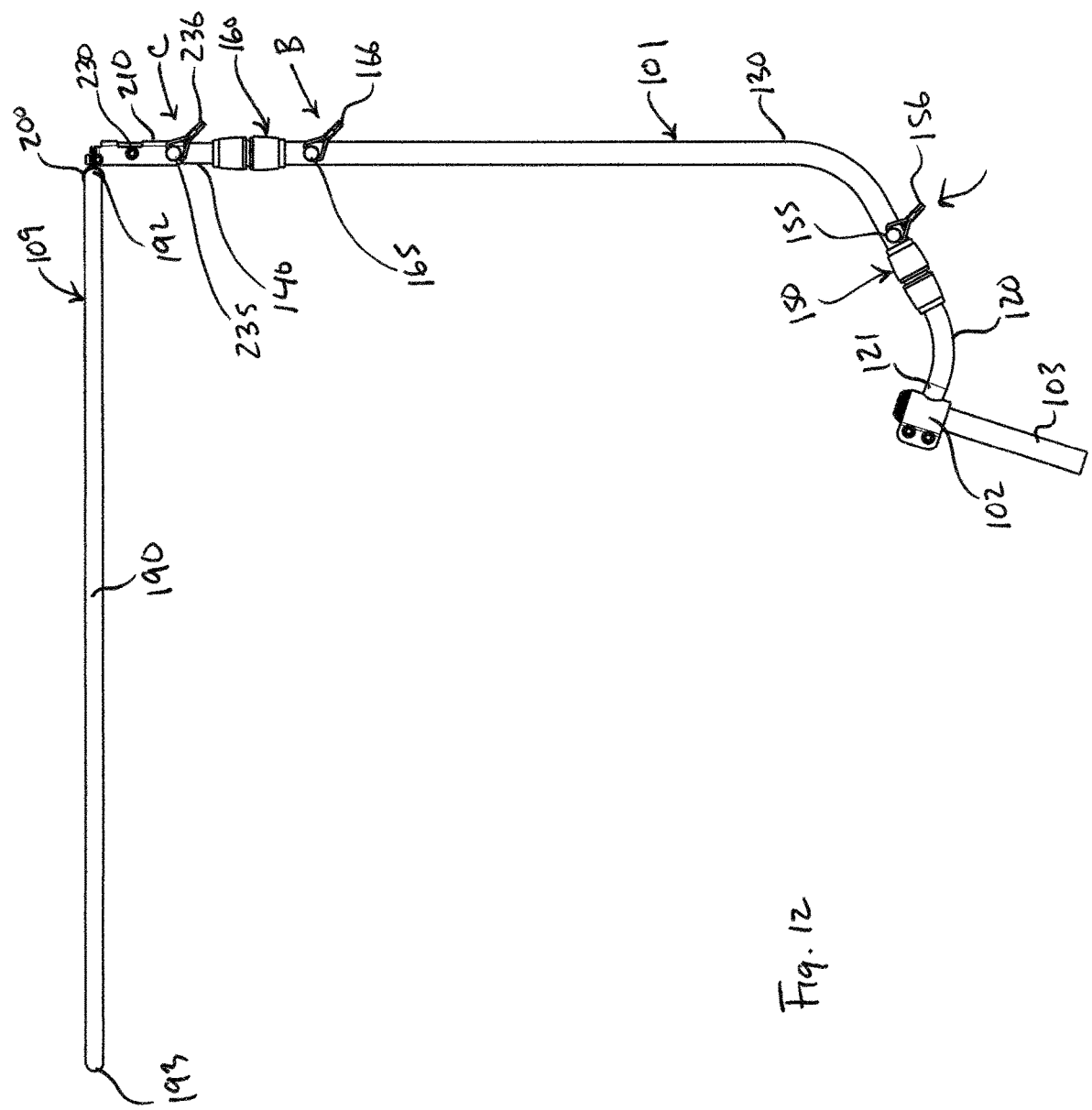
FIG. 12 is a side elevation view of the embodiment of FIG. 11.

FIG. 9 is an enlarged perspective view of the canopy apparatus 100 of FIG. 8 shown with bracket 102 fixed to seat post 103, and FIG. 10 is a side elevation view of the embodiment of FIG. 9. FIGS. 11 and 12 illustrate the embodiment of FIGS. 9 and 10 shown without canopy cover 106 and caution flag 107 of FIGS. 9 and 10 to better illustrate support assembly 101, canopy frame 109, which is configured to support canopy cover 106, and bracket 200. Canopy apparatus 100 is collapsible. Specifically, canopy 105 is mounted to support assembly 101 for movement between a collapsed or stowage position of canopy 105 indicated by the dotted line position of canopy 105 juxtaposed with support assembly 101 in FIG. 10 and an operative or deployed position as shown in FIGS. 8-10 extending outwardly and forwardly from support assembly 101 for shading or sheltering a rider of bicycle 15 in FIG. 8 from the Sun and weather conditions by canopy cover 106 of canopy 105. Canopy 105 can be selectively adjusted from the stowage position during non-use and for being stored during periods of non-use, and the operative position for and during use. Bracket 200 connects connect canopy frame 109 to support assembly 101, and is mounted to support assembly 101 for movement of canopy 105 between its operative position and its dotted line stowage position in FIG. 10. More specifically, bracket 200 is mounted to canopy frame 109 for movement of canopy 105 between its operative position and its stowage position relative to support assembly 101.

In FIGS. 11 and 12, support assembly 101 includes lower segment 120, upper segment 140, and intermediate segment 130. Each of lower segment 120, intermediate segment 130, and upper segment 140 is a hollow structural tubing formed of metal, plastic, carbon fiber, or other material or combination of materials having inherently strong, resilient, impact resistant, and weather resistant material characteristics.

Intermediate segment 130 is between lower segment 120 and upper segment 140, and is connected releasably to both lower segment 120 and upper segment 140. Lower segment 120 and intermediate segment 130 are connected together releasably with a lower retention assembly A. Intermediate segment 130 and upper segment 140 are connected together releasably with an upper retention assembly B. Bracket 200 is part of canopy 105, is coupled between canopy frame 109 and upper segment 140, and connects canopy frame 109 to upper segment 140. Lower 120 segment extends outwardly from bracket 102 to intermediate segment 130, intermediate segment 130 extends outwardly from lower segment 120 and upwardly to upper segment 140, and upper segment 140 extends upwardly from intermediate segment 130 to canopy frame 109 connected to upper segment 140 by bracket 200.

In the bicycle 15 and canopy apparatus 100 assembly in FIG. 8, lower segment 120 extends from attached bracket 102 fixed to seat post 103 outwardly to the rear of seat post 103 under seat 103A and upwardly behind seat 103A to intermediate segment 130. Intermediate segment 130 extends outwardly from lower segment 120 to the rear of seat 103A and upwardly to upper segment 140 (concealed from view in FIG. 8 by canopy 105 and caution flag 107). Upper segment 140 extends upwardly to attached canopy 105 supported by support assembly 101 at its elevated location over bicycle 15. In FIGS. 11 and 12, a lower compression coupling 150 and a lower lock pin 155 of lower retention assembly A secures lower and intermediate segments 120 and 130, and an upper compression coupling 160 and an upper lock pin 165 of upper retention assembly B secures intermediate and upper segments 130 and 140. Like the previously-described lower segment or arm 50, lower segment 120 does not extend much if at all behind bicycle seat 103A in FIG. 8, which, like the previously-described lower segment or arm 50, is designed to support canopy apparatus 100 behind seat 103A and avoid encroaching on the rider or the rider's buttocks or otherwise interfering with the ability of a rider to ride bicycle 15 in a customary and ordinary manner.

Figure 13:
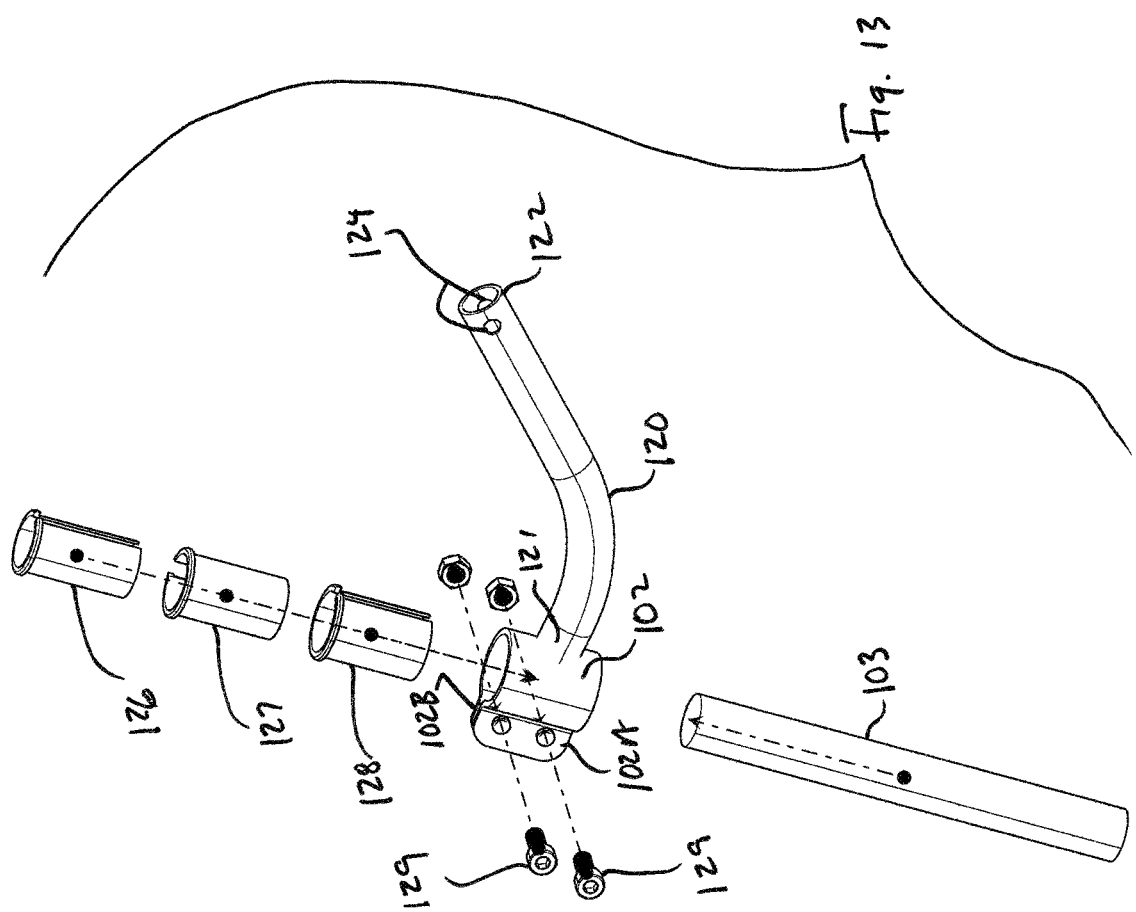
FIG. 13 is an enlarged, exploded view of the bracket, seat post, and seat post shims corresponding to FIG. 11 and illustrating the lower segment extending outwardly from the attached bracket.

Referring to FIG. 13, lower segment 120 is elongate includes inner end 121 and outer end 122. Inner end 121 is rigidly affixed to bracket 102. Lower segment 120, a curved member, extends outwardly from inner end 121 rigidly affixed to bracket 102 and curves upwardly to outer end 122 formed with a pair of axially-aligned holes 124 configured to accept lower lock pin 155 of lower retention assembly A. Bracket 102 is a standard, circular, seat post clamp that is severed to form opposed ends 102A and 102B configured to be secured together with standard nut-and-bolt assemblies 129. Bracket 102 is designed to be received over and tightened against a seat post by clamping ends 102A and 102B together with nut-and-bolt assemblies 129 received through appropriate holes in ends 102A and 102B to reduce the inner diameter of bracket 102 into frictional engagement against the outer diameter of the seat post 103.

Figure 15:
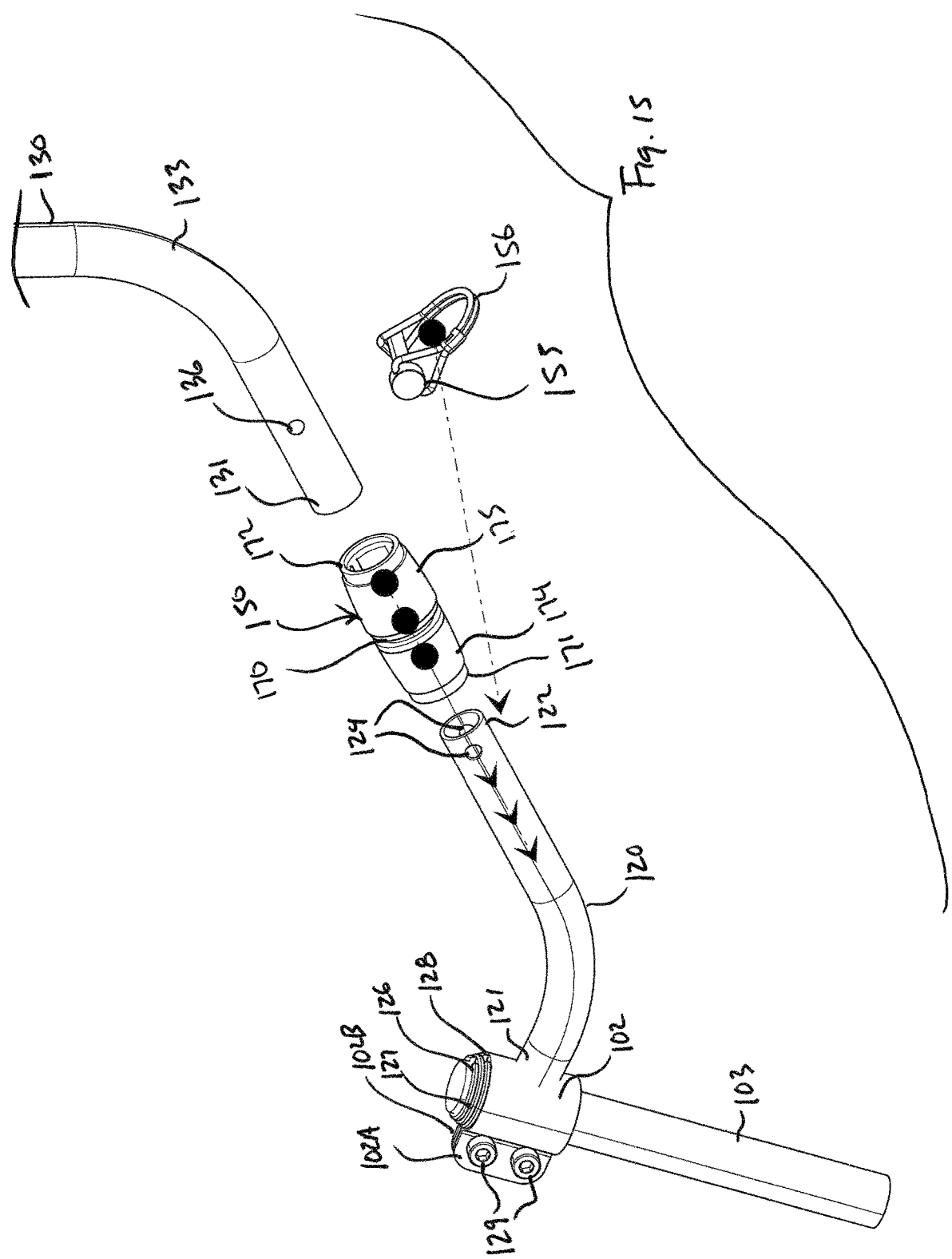
FIG. 15 is an enlarged, fragmentary view corresponding to FIGS. 13 and 14 illustrating the bracket fixed over the seat post shims received over the bicycle seat post, and the lower segment, the lower compression coupling, the intermediate segment, and the lower lock pin shown as they would appear exploded in preparation for assembly.

Because seat posts can have varying outer diameters, standard, differently-sized seat post shims 126, 127, and 128 are provided in this example, one or more of which are configured to be positioned over seat post 103 to enable bracket 102 to clamp over seat post 103. Shim 128 is an outermost shim and is larger than shim 127, which is an intermediate shim that is larger than shim 126, which is an innermost shim sized to be received directly over seat post 103. Shims 126, 127, and 128 are complementary, in which shim 128 is configured to accept shim 127, shim 127 is configured to accept shim 126, and shim 126 is configured to be received over seat post 103. In FIG. 15, shim 127 is fitted into shim 128, shim 126 is fitted into shim 127, shim 126 is fitted over seat post 103, and bracket 102 is fitted over shim 128 and is tightened against shim 128 by clamping ends 102A and 102B together with nut-and-bolt assemblies 129 as described above to reduce the inner diameter of bracket 102 into frictional engagement against shim 128 and to forcibly clamp shims 126, 127, and 128 together between bracket 102 and the outer diameter of seat post 103 thereby fixing bracket 102 to seat post 103. In this example, three shims 126, 127, and 128 are interposed between bracket 102 and seat post 103 to enable bracket 102 to clamp fixedly in place on seat post 103. In alternate embodiments, less or more of the described shims, and even just one of the described shims, whether shim 126, shim 127, or shim 127 depending on the size of seat post 103, can be interposed between bracket 102 and seat post 103 to enable bracket 102 to clamp fixedly in place on seat post 103 depending on the relative size difference between bracket 102 and seat post 103.

Figure 14:
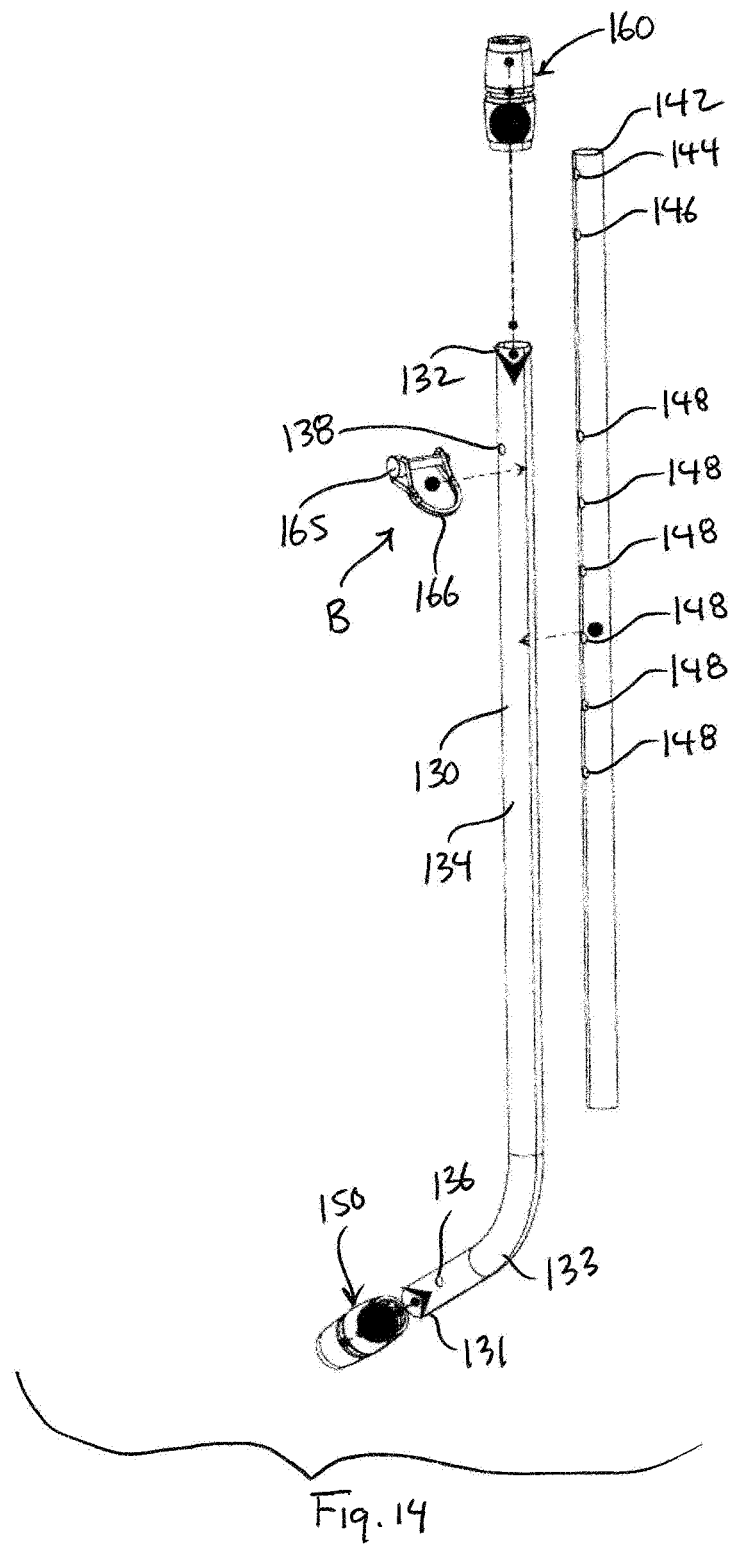
FIG. 14 is an exploded perspective view of the intermediate and upper segments, the lower and upper compression couplings, and the upper lock pin corresponding to FIG. 11.

Intermediate segment 130 in FIG. 14 is elongate and includes lower end 131, upper end 132, curved section 133, and straight section 134. Straight section 134 extends downwardly from upper end 132 to curved section 133, which curves downwardly and outwardly to lower end 131. Lower end 131 is formed with a pair axially-aligned holes 136 configured to accept lower lock pin 155 of lower retention assembly A. Intermediate segment 130 is additionally formed a pair of axially-aligned holes 138 adjacent to upper end 132 which are configured to accept upper lock pin 165 of upper retention assembly B.

Upper segment 140 is elongate and straight and includes lower end 141 and opposed upper end 142. Upper end 142 is formed with a pair of axially-aligned holes 144 configured to accept a nut-and-bolt assembly for pivotally connecting upper end 142 to bracket 200 connected to canopy frame 109. Just below holes 144 are a pair of axially-aligned holes 146 configured to accept a canopy lock pin pf a canopy retention assembly described below. Upper segment 140 is additionally formed with equally spaced apart pairs of axially-aligned holes 148 between holes 146 and lower end 141 along an intermediate section of upper segment 140.

In assembled support assembly 101 in FIGS. 11 and 12, lower segment 120 extends outwardly from bracket 102 affixed to inner end 121 and upwardly to attached intermediate segment 130, intermediate segment 130 extends outwardly from attached lower segment 120 and upwardly to attached upper segment 140, and upper segment 140 extends upwardly from attached intermediate segment 130 to canopy frame 109 attached to upper segment 140 by bracket 200. Support assembly 101 is the assembly of lower segment 120, intermediate segment 130, and upper segment 140 by lower and upper retention assemblies A and B, and lower and upper compression couplings 150 and 160.

Lower segment 120 and intermediate segment 130 are telescoped, namely, parts that fit and slide one within another to form a telescoped joint therebetween. Likewise, intermediate segment 130 and upper segment 140 are telescoped, namely, parts that fit and slide one within another to form a telescoped joint therebetween.

In FIG. 15 lower end 131 of intermediate segment 130 and outer end 122 of lower segment 120 are configured to be joined telescopingly to form a telescoped joint. Compression coupling 150 of the lower retention assembly is positioned between outer end 122 of lower segment 120 and lower end 131 of intermediate segment 130. Compression coupling 150, which is well-known and of standard construction and not previously employed in canopy apparatus of the type disclosed herein, includes sleeve 170 having opposed compressible ends 171 and 172, a collar 174 threaded onto end 171, and an opposed collar 175 threaded onto end 172. In the assembly of lower and intermediate segments 120 and 130 with reference in relevant part to FIGS. 15 and 18, lower segment 120 and intermediate segment 130 are joined telescopingly to form telescoped joint J1 in FIG. 18.

In this embodiment, lower end 131 of intermediate segment 130 is configured to be telescoped, i.e. inserted slidably, into lower segment 120 through outer end 122. Lower end 131 of intermediate segment 130 is inserted into sleeve 170 through end 172, and outer end 122 of lower segment 120 is inserted into sleeve 170 through end 171 and additionally to form telescoped joint J1 telescopingly into intermediate segment 130 through lower end 131 to align openings 124 of lower segment 120 with openings 136 of intermediate segment 130 outboard of end 172 of sleeve 170. Openings 124 of lower segment 120 and openings 136 of intermediate segment 130 are part of the lower retention assembly A. Lock pin 155 of the lower retention assembly A is inserted through the aligned pairs of openings 124 and 136 outboard of end 172 of sleeve 170 and is secured in place with its standard integrated clip 156. Lock pin 155 pins and locks lower segment 120 to intermediate segment 130 thereby disabling lower segment and intermediate segment from telescoping relative to each other and detaching from one another.

Compression coupling 150 concurrently circumscribes and secures telescoped joint J1 in compression from lower segment 120 to intermediate segment 130. Sleeve 170 of compression coupling 150 concurrently circumscribes telescoped joint J1 between lower and intermediate segments 120 and 130, namely, overlapping lower segment 120 and intermediate segment 130 between lock pin 155 and bracket 102, and extends beyond end 172 circumscribing end 131 of intermediate segment 130 to end 171 circumscribing a part of lower segment 120 extending outwardly from lower end 131 of intermediate segment 130. Collars 174 and 175 are rotated in opposite directions to thereby automatically compress end 171 by collar 174 against the part of lower segment 120 extending outwardly from lower end 131 of intermediate segment 130 and to automatically compress end 172 by collar 175 against lower end 131 of intermediate part 130 thereby securing lower segment 120 to lower end 131 of intermediate segment 130 in compression. This secures telescoped joint J1 between lower and intermediate segments 120 and 130 in compression and inherently disables lower end 131 of intermediate segment 130 and lower segment 120 inserted into intermediate segment 130 through lower end 131 from rattling against one another and generating unwanted sound. To release lower segment 120 from intermediate segment, this operation need only be reversed.

Referring to FIG. 14, lower end 141 of upper segment 140 and upper end 132 of intermediate segment 130 are configured to be joined telescopingly to form a telescoped joint. In this example, lower end 141 of upper segment 140 is configured to be telescoped, i.e. inserted slidably, into straight section 134 of intermediate segment 130 through upper end 132 for telescoping motion for enabling length adjustment of the overall length of support assembly 101 from bracket 102 to upper end 142 of upper segment 140 for adjusting the height between seat 103A and canopy 105 in the assembly of canopy apparatus 100 with bicycle 15 in FIG. 8.

Figure 19:
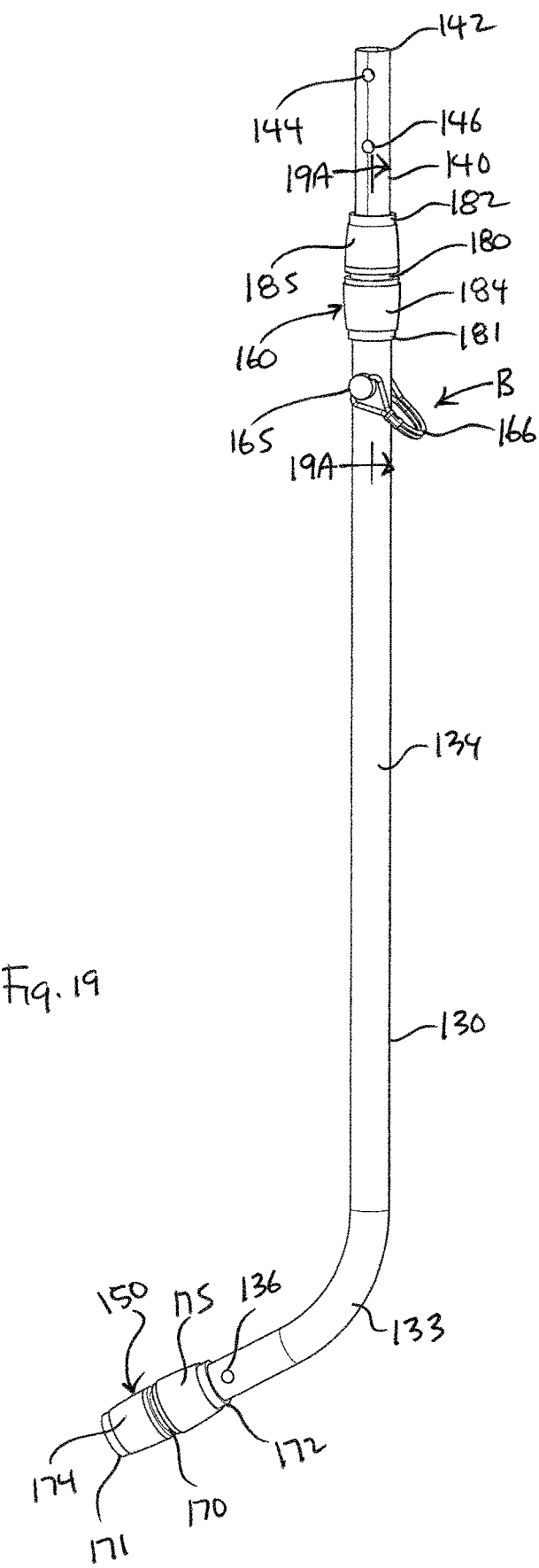
FIG. 19 is an assembled view of the embodiment of FIG. 14.

In the assembly of upper segment 140 to intermediate segment 130 with reference in relevant part to FIGS. 14, 19, and 19A, intermediate segment 130 and upper segment 130 are joined telescopingly to form telescoped joint J2 in FIG. 19A. Compression coupling 160 is between upper end 132 of intermediate segment 130 and lower end 141 of upper segment 140. Compression coupling 160, which is identical to compression coupling 150 in every respect, includes sleeve 180 having opposed compressible ends 181 and 182, a collar 184 threaded onto end 181, and an opposed collar 185 threaded onto end 182. Upper end 132 of intermediate segment 130 is inserted into sleeve 180 through end 181, and lower end 141 of upper segment 140 is inserted into sleeve 180 through end 182 and additionally to form telescoped joint J2 slidably into straight section 134 of intermediate segment 130 through upper end 132 to enable alignment of any chosen pair of openings 148 of upper segment 140 with openings 138 of intermediate segment 130 outboard of end 181 of sleeve 180. Openings 138 of intermediate segment 130 and the various pairs of openings 148 of straight section of intermediate section 130 are part of the upper retention assembly B. With openings 138 of intermediate segment 130 aligned with a chosen pair of openings 148 of upper segment 140 to thereby set support assembly 101 to a chosen length from bracket 102 to upper end 142 of upper segment 140, lock pin 165 of the upper retention assembly is inserted through openings 138 of intermediate segment 130 and the aligned chosen pair of openings 148 of upper segment 140 outboard of end 181 of sleeve 180 and is secured in place with its standard integrated clip 166 in FIGS. 19 and 19A. Lock pin 165 pins and locks upper segment 140 to intermediate segment 130 thereby disabling upper segment 140 and intermediate segment 130 from telescoping relative to each other and detaching from one another. Upper segment 140 extends upwardly/outwardly from upper end 132 of intermediate segment 130 and end 182 of compression coupling 160 to openings 146, openings 144, and terminates upwardly with upper end 142 on the outer side of end 182 of compression coupling 160 and which is configured to be connected to canopy frame 109 of canopy 105 to enable canopy frame 109 to displace pivotally between the operative position of canopy 105 in FIG. 10 and the dotted line stowage position of canopy 105 in FIG. 10.

Compression coupling 160 concurrently circumscribes and secures telescoped joint J2 from intermediate segment 130 to upper segment 140. Sleeve 180 of compression coupling 160 concurrently circumscribes telescoped joint J2 between intermediate and upper segments 130 and 140, namely, overlapping intermediate segment 130 and upper segment 140 between lock pin 165 and end 182 of sleeve 180 of compression coupling 160, and extends beyond end 181 circumscribing upper end 132 of intermediate segment 130 to end 182 circumscribing a part of upper segment 140 extending outwardly from upper end 132 of intermediate segment 130. Collars 184 and 185 are rotated in opposite directions to thereby compress end 181 by collar 184 against upper end 132 of intermediate segment 130 and compress end 182 by collar 185 against the part of upper segment 140 extending outwardly from upper end 132 of intermediate segment 130 thereby securing upper end 132 of intermediate segment 130 to upper segment 140 in compression. This secures telescoped joint J2 between intermediate and upper segments 130 and 140 in compression thereby inherently disabling upper end 132 of intermediate segment 130 and upper segment 140 inserted into intermediate segment 130 through upper end 132 from rattling against one another and making unwanted sound. To release upper segment 140 from intermediate segment 130, this operation need only be reversed. Openings 138 of intermediate segment 130 can be aligned with any one of the pair of openings 148 of upper segment 140 to thereby set support assembly 101 to a chosen length from bracket 102 to upper end 142 of upper segment 140.

Referring back to FIG. 11, canopy frame 109 includes opposed, spaced-apart and parallel side members 190 and 191 that extend between opposed, spaced-apart and parallel end members 192 and 193. This defines canopy frame 109, which is an open frame in this example. Side members 190 and 191 and end members 192 and 193 are each a hollow structural tubing formed of metal, plastic, carbon fiber, or other material or combination of materials having inherently strong, resilient, impact resistant, and weather resistant material characteristics.

In FIG. 20, canopy frame 109 is configured with bracket 200. Bracket 200 circumscribes end member 192 centrally and is severed to form opposed ends 200A and 200B secured together with standard nut-and-bolt assemblies 205 received by appropriate holes in ends 200A and 200B. Bracket 200 received over end member 192 is tightened against end member 192 by clamping ends 200A and 200B together with nut-and-bolt assemblies 205 received through the appropriate holes in ends 200A and 200B to reduce the inner diameter of bracket 200 into frictional engagement against the outer diameter of the end member 192.

Bracket 200 is fashioned with attached support member 210 configured to be mounted pivotally to upper segment 140 for movement of canopy 105 between its previously-described stowage and operative positions. Support member 210 depends downwardly from end 200B of bracket 200. Support member 210 is elongate and includes closed upper end 211 rigidly affixed centrally to end 200B, and depends downwardly therefrom to opposed open lower end 212.

Support member 210 is U-shaped between closed upper end 211 and open lower end 212, and is defined by opposed parallel side walls 214 and 215 and end wall 216 therebetween that concurrently depend downwardly from closed upper end 211 of support member 210 to open lower end 212 of support member 210. Side walls 214 and 215 define front or forward opening 218, additionally shown in FIGS. 23-26, of support member 210 to within support member 210. Opening 218 extends along the length of support member 210 from closed upper end 211 to open lower end 212, and opposes rear opening 219 of support member 210 through end wall 216 between closed upper end 211 and open lower end 212. A pair of upper axially-aligned holes 220 are formed through the respective side walls 214 and 215 adjacent to opening 219, and a pair of lower axially-aligned holes 221 are formed through the respective side walls 214 and 215 adjacent to lower end 212.

Figure 21:
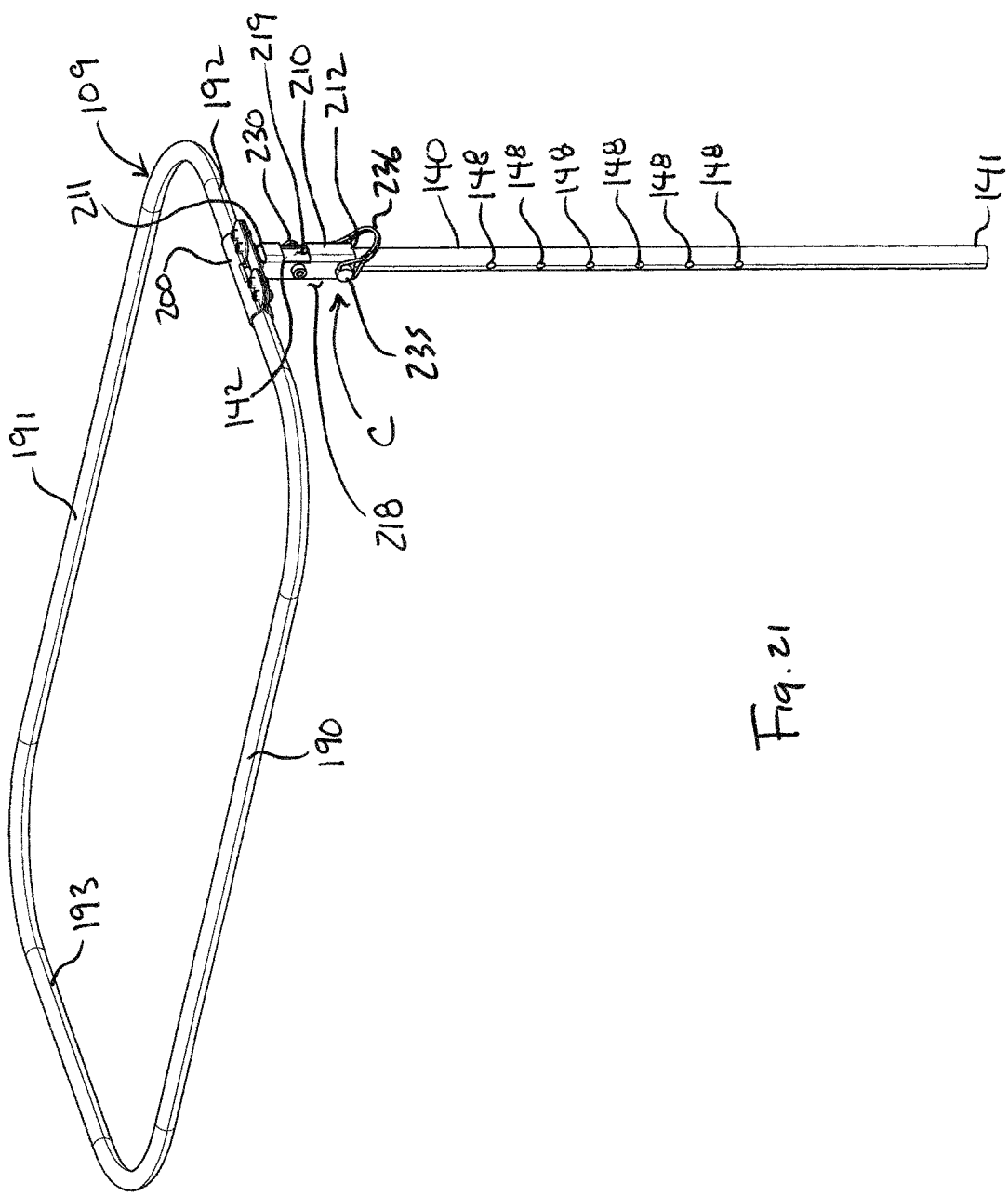
FIG. 21 is a perspective view corresponding to FIG. 11 illustrating the upper segment depending downwardly from its upper end attached to the support member of the bracket assembly of the canopy frame.

Referring in relevant part to FIGS. 20 and 21, upper end 142 of upper segment 140 extends into support member 210 through open lower end 212, openings 144 in upper end 142 of upper segment 120 are aligned with openings 220 of support member 210, and openings 146 of upper segment 120 are aligned with openings 221 of support member 210. This corresponds to the operative position of canopy frame 109 of canopy 105 relative to upper segment 140 of support assembly 101. Support member 210 is mounted to upper end 142 of upper segment 140 for pivotal movement at a pivotal connection for enabling canopy frame 109 to pivot between the stowage and operative positions of canopy 105. The pivotal connection in this embodiment includes nut-and-bolt assembly 230 received through openings 144 of upper end 142 of upper segment and openings 220 of support member 210.

Retention assembly C is provided for retaining canopy frame 109, and thus canopy 105 when canopy cover 106 and canopy frame 109 are assembled, in the operative position, disabling canopy frame 109, and thus canopy 105 when canopy cover 106 and canopy frame 109 are assembled, from tipping pivotally at the pivotal connection out of the operative position under the inherent weight of canopy frame 109, and also canopy 105 when canopy cover 106 and canopy frame 109 are assembled. Retention assembly C, which is a canopy retention assembly configured to retain canopy 105 in the operative position, includes lock pin 235, openings 146 of upper segment 120, and openings 221 of support member 210. Lock pin 235 of the canopy retention assembly is inserted through openings 146 of upper segment 140 and the aligned openings 221 of support member 210 and is secured in place with its standard integrated clip 236. This installation of lock pin 235 through openings 146 of upper segment 140 and the aligned openings 221 of support member 210 together forming retention assembly C secures canopy frame 109 in the operative position and disables support member 210 from pivoting at is pivotal connection to upper end 142 of upper segment 140 to the stowage position of canopy frame 109 of canopy 105 from the operative position of canopy frame 109 of canopy 105. Lock pin 235 thereby pins and locks upper support member 210 to upper segment 140 thereby disabling support member 210 and upper segment 140 from pivoting relative to one another.

Figure 22:
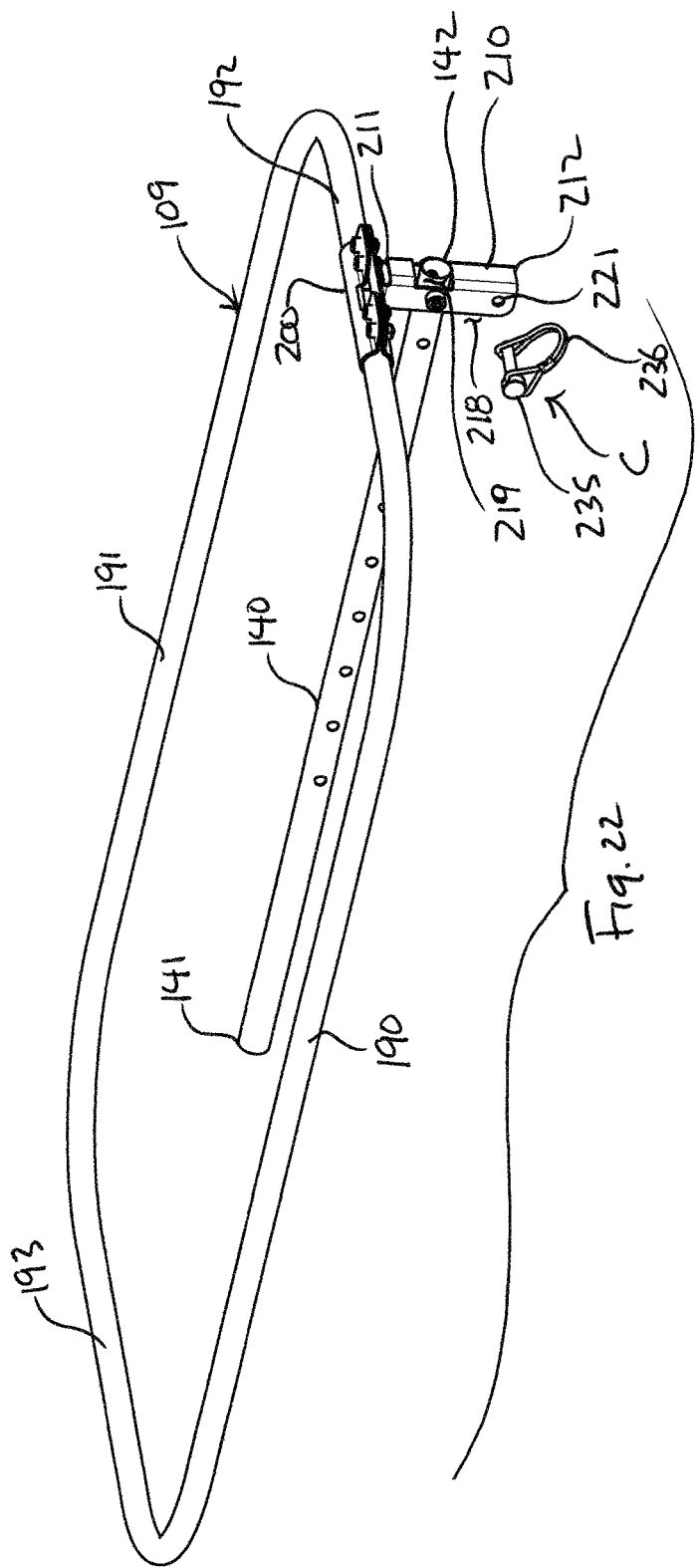
FIG. 22 is a view corresponding to FIG. 21 illustrating the canopy frame as it would appear pivoted to a stowage position relative to the upper segment of the support assembly first illustrated in FIG. 8.
Figure 42:
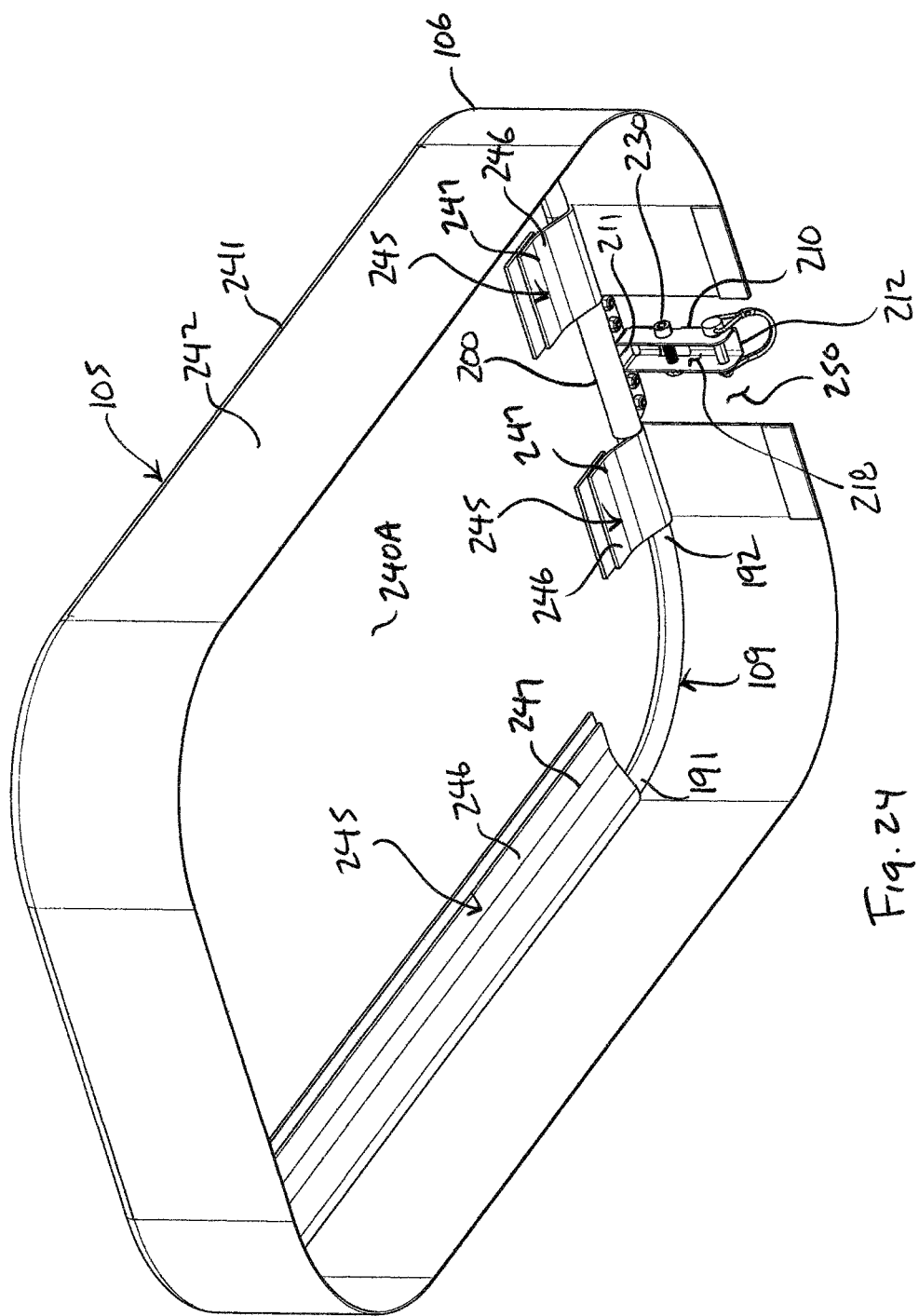

End wall 216 at the rear of support member 210 interacts interferingly with upper segment 140 between opening 219 and open lower end 212 when canopy frame 109 of canopy 105 is in the operative position in FIG. 21 thereby disabling canopy frame 109, and thus canopy 105 when canopy cover 106 and canopy frame 109 are assembled, from moving pivotally beyond the operative position. To enable canopy frame 109, and thus canopy 105 when canopy cover 106 and canopy frame 109 are assembled, to pivot from the operative position to the stowage position, lock pin 235 is withdrawn in FIG. 22 by reversing the installation of lock pin 235. Forwardly-facing opening 218 through support member 210 enables support member 210 to translate outwardly from upper segment 140 in response to movement of canopy frame 109 downwardly from its operative position to its stowage position and upwardly from its stowage position to its operative position. Further, opening 219 through end wall 216 in FIG. 22 provides clearance for upper end upper end 142 of upper segment 140 to translate therethrough in response to movement of canopy frame 109 between its stowage and operative positions for enabling canopy 150 to pivotally displace unrestricted between its operative and stowage positions.

As described above, the assembly of canopy cover 106 and canopy frame 109 form canopy 105. In FIG. 23, canopy cover 106 includes base 240 and valance 242 depending downwardly from perimeter of base 240. Canopy cover 106 can be any screen or mesh of one or more fabrics or textiles sufficient to enable canopy cover 106 to provide shade or shelter from the Sun and weather conditions and having inherent weather and ultraviolet light resistant material characteristics. Canopy cover 106 is connected to canopy frame 109 by fasteners 245. In a particular example, each fastener 245 is a flap 246 extending from perimeter edge 241 of cover 106. Side members 190 and 191 and end members 192 and 193 of canopy frame 109 relate to perimeter edge 241. Cover 106 is received over canopy frame 109, and side members 190 and 191 and end members 192 and 193 extend along perimeter edge 241. The various flaps 246 are folded over side members 190 and 191 and end members 192 and 193 and are secured to bottom surface 240A of base 240 with stitching 247 in this example securing cover 106 to canopy frame 109 thereby forming canopy 105, namely, the assembly of canopy cover 106 and frame 109. Hook-and-loop fasteners, snap fasteners, button fasteners, or the like can be used to secure flaps 246 down in alternate embodiments.

Bracket 200 and its attached support member 210 reside in gap 250 of valance 242 in FIG. 24. Canopy 106 can be mounted and secured to canopy frame 109 in various ways according to the skill attributed to the skilled artisan in the art of canopies.

Figure 25:
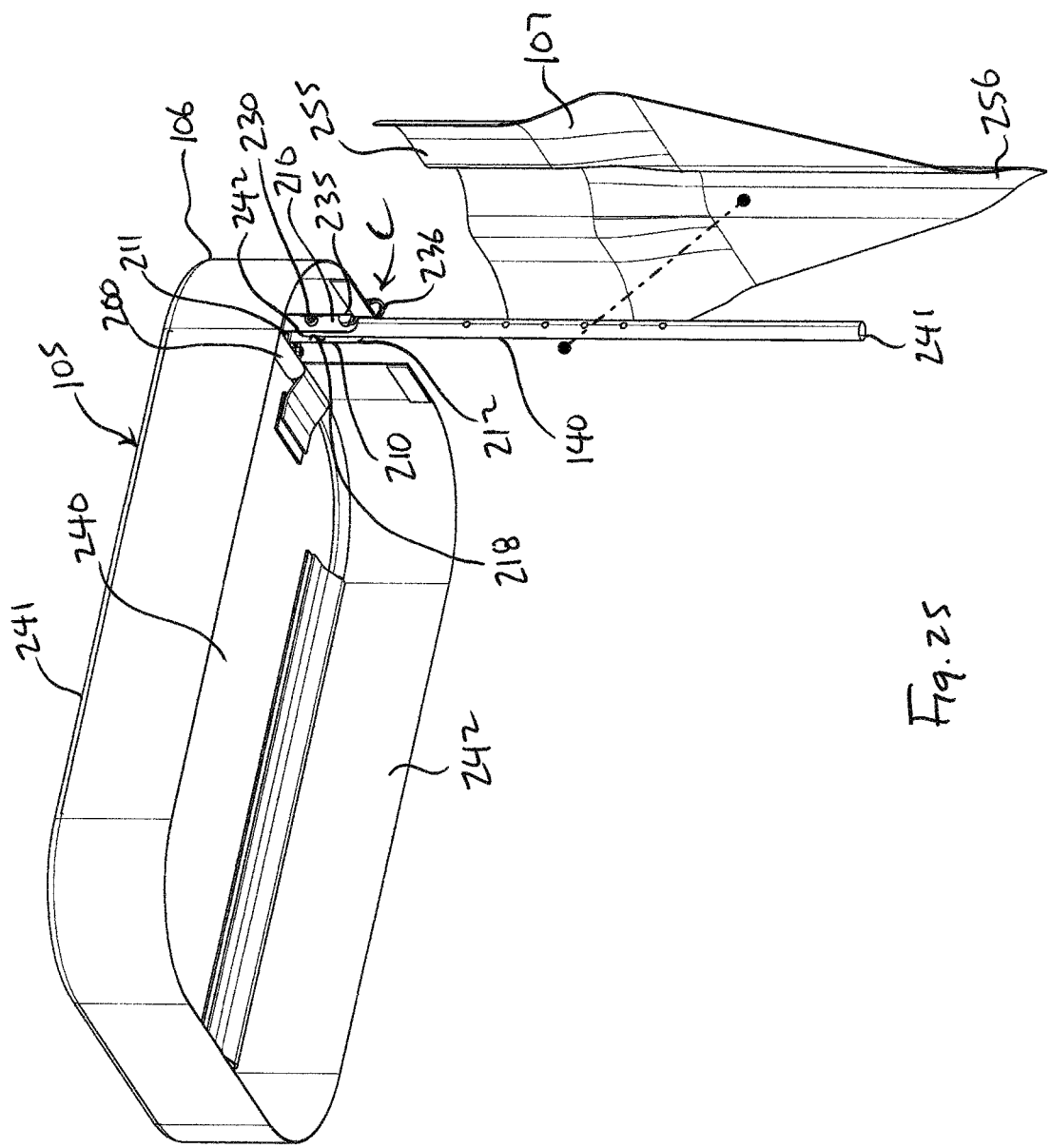
FIG. 25 is a perspective view corresponding to FIG. 21 illustrating the upper segment depending downwardly from its upper end attached to the support member of the bracket assembly of the canopy frame, and additionally corresponding to FIG. 8 illustrating the canopy cover and the canopy frame assembled thereby forming the canopy, and the caution flag shown as it would appear detached from the canopy.

In FIG. 25, support member 210 is connected to upper segment 140, canopy 105 of FIG. 24 is in its operative position relative to upper segment 140, canopy 105 is secured in its operative position with the previously described retention assembly C, and caution flag 107 is shown detached from canopy 105. Caution flag 107 can be any screen or mesh of one or more fabrics or textiles having inherent weather and ultraviolet light resistant material characteristics. Caution flag 107 is configured to increase the visibility of canopy apparatus 100, and to this end is preferably bright colored in red, orange, or other color or combination of colors configured to be easily seen. Caution flag 107 can incorporate reflective features if desired in a particular embodiment. In this example, caution flag 107 is generally triangular in shape, and tapers downwardly from a wide upper end 255 to a comparatively narrow lower end 256.

Figure 26:
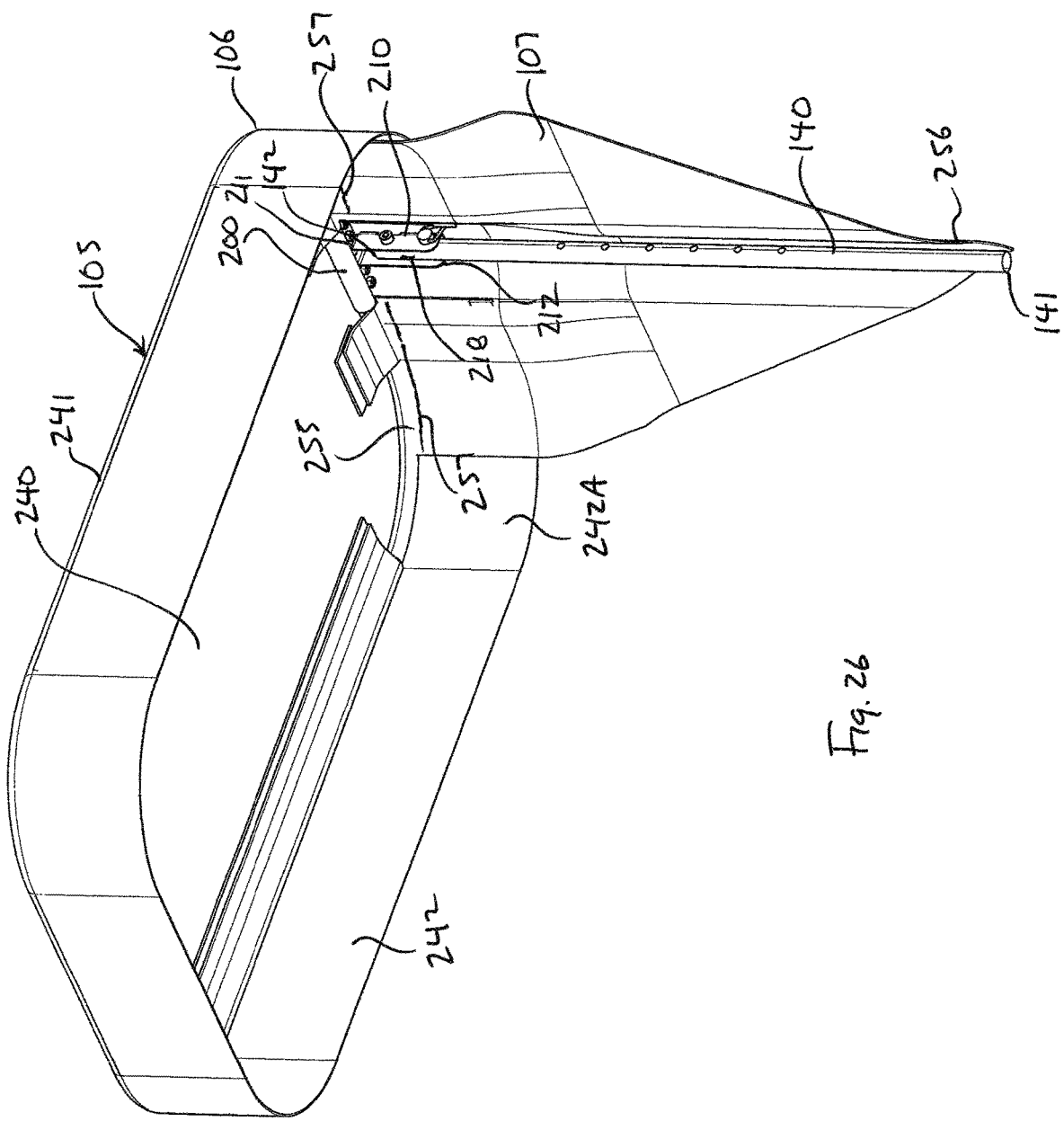
FIG. 26 is a view similar to FIG. 25 illustrating the caution flag attached to and depending downwardly from the canopy.

In the assembly of caution flag 107 and canopy 105 in FIG. 26, an intermediate part of upper end 255 covers bracket 200 and support member 210. Upper end 255 extends across gap 250 over bracket 200 and support member 210 and outwardly from either side of gap 250 along inner surface 242A of valance 242, and is secured to inner surface 242A of valance 242 with stitching 257. Hook-and-loop fasteners, snap fasteners, button fasteners, or the like can be used to secure caution flag 107 to valance 242 of canopy cover 106 of canopy 105 in alternate embodiments. Bracket 200 and its attached support member 210 reside in gap 250 of valance 242 in FIG. 24. Caution flag 107 depends downwardly from upper end 255 connected to inner surface 242A of valance 242 of canopy 105 along upper segment 140 to lower end 256 proximate to lower end 141 of upper segment 140.

In sum, and referring to FIGS. 8-12 in relevant part, canopy apparatus 100 includes support assembly 101 extending from attached bracket 102 configured to be fixed to bicycle 15 to attached canopy 105 extending outwardly from support assembly 101 over bracket 102 for providing a rider of bicycle 15 with shade or shelter from the Sun and weather conditions. Caution flag 107 depends downwardly from canopy 105 along support assembly 101 at the rear of canopy apparatus 100 to an intermediate position of support 101 assembly between bracket 102 and canopy 105. Support assembly includes lower segment 120, upper segment 140, and intermediate segment 130 therebetween connected releasably to both lower segment 120 and upper segment 140. Lower segment extends outwardly and rearwardly from bracket 102 to intermediate segment 130, intermediate segment extends outwardly and rearwardly from lower segment 120 and upwardly to upper segment 140, and upper segment 140 extends upwardly from intermediate segment 130 to canopy 105. Caution flag 107 depends downwardly from canopy 105 to an intermediate position of intermediate segment 130 between lower segment 120 and upper segment 140.

Lower segment 120 and intermediate segment 130 are joined telescopingly forming telescoped joint J1, intermediate segment 130 and upper segment 140 are joined telescopingly forming telescoped joint J2, retention assembly A releasably connects lower segment 120 to intermediate segment 130 disabling lower segment 120 and intermediate segment 130 from telescoping relative to one another, retention assembly B releasably connects intermediate segment 130 to upper segment 140 disabling intermediate segment 130 and upper segment 140 from telescoping relative to one another, compression coupling 150 concurrently circumscribes and secures telescoped joint J1 from lower segment 120 to intermediate segment 130, and compression coupling 160 concurrently circumscribes and secures telescoped joint J2 from intermediate segment 130 to upper segment 140. Telescoped joint J1 is characterized by one of outer end 122 of lower segment 120 and lower end 131 of intermediate segment 130 received slidably within the other one of outer end 122 of lower segment 120 and lower end 131 of intermediate segment 130, and compression coupling 150 concurrently circumscribes and secures one of lower segment 120 and intermediate segment 130 and the other one of outer end 122 of lower segment 120 and lower end 131 of intermediate segment 130 in compression. Retention assembly A includes lock pin 155 received by corresponding holes 124 and 136 in lower segment 120 and intermediate segment 130, respectively. Telescoped joint J2 is characterized by one of an upper end 132 of intermediate segment 130 and lower end 141 of upper segment 140 received slidably within the other one of upper end 132 of intermediate segment 130 and lower end 141 of upper segment 140, and compression coupling 160 concurrently circumscribes and secures one of intermediate segment 130 and upper segment 140 and the other one of upper end 132 of intermediate segment 130 and lower end 141 of upper segment 140 in compression. Retention assembly B includes lock pin 165 received by corresponding holes 138 and 148 in intermediate segment 130 and upper segment 140, respectively.

Canopy 105 is mounted to upper segment 140 of support assembly 101 for movement between its stowage position juxtaposed with support assembly 101 shown by the dotted line position of canopy 105 in FIG. 10 and the operative position extending outwardly and forwardly from upper segment 140 of support assembly 101 over bracket 102 for providing shade or shelter from weather conditions. Retention assembly C is provided in FIGS. 20 and 21 for retaining canopy 105 in the operative position. Retention assembly C includes lock pin 235 received by corresponding holes 146 and 221 in upper segment 140 of support assembly 101 and support member 210 of canopy 105, respectively. Support member 210 of canopy 105 is configured to interact with upper segment 140 of support assembly 101 when canopy 105 is in the operative position thereby disabling canopy 105 from moving beyond the operative position. Support member 210 is mounted to upper segment 140 of support assembly 101 for movement of canopy 105 between the stowage position and the operative position. Bracket 102 is configured to be fixed to seat post 103 of bicycle 15. One or more seat post shims 126, 127, and/or 128 is/are configured to be positioned between seat post 103 and bracket 102 to enable bracket 102 to be fixed to seat post 103.

The present invention is described above with reference to illustrative embodiments. However, those skilled in the art will recognize that changes and modifications may be made in the described embodiments without departing from the nature and scope of the present invention. Various further changes and modifications to the embodiments herein chosen for purposes of illustration will readily occur to those skilled in the art. To the extent that such modifications and variations do not depart from the spirit of the invention, they are intended to be included within the scope thereof.

Having fully described the invention in such clear and concise terms as to enable those skilled in the art to understand and practice the same, the invention claimed is:

1. A canopy apparatus, comprising:
    a support assembly extending from an attached bracket configured to be fixed to a bicycle to an attached canopy extending outwardly from the support assembly over the bracket for providing shade or shelter from the Sun and weather conditions, the canopy comprising a canopy frame and a canopy cover comprising a valence depending downwardly from a base extending over the canopy frame; and
    a caution flag configured to increase the visibility of the canopy apparatus, the caution flag depending downwardly along the support assembly without being wrapped thereabout from a wide upper end secured directly to the valence to a comparatively narrow lower end at an intermediate position of the support assembly between the bracket and the canopy.

2. The canopy apparatus according to claim 1, wherein the support assembly comprises a lower segment, an upper segment, and an intermediate segment therebetween connected releasably to both the lower segment and the upper segment, the lower segment extends outwardly from the bracket to the intermediate segment, the intermediate segment extends outwardly from the lower segment and upwardly to the upper segment, and the upper segment extends upwardly from the intermediate segment to the canopy.

3. The canopy apparatus according to claim 2, wherein the caution flag is triangular in shape.

4. The canopy apparatus according to claim 2, additionally comprising:
    the lower segment and the intermediate segment are joined telescopingly forming a telescoped joint;
    a retention assembly releasably connecting the lower segment to the intermediate segment disabling the lower segment and the intermediate segment from telescoping relative to one another; and
    a compression coupling concurrently circumscribing and securing the telescoped joint from the lower segment to the intermediate segment.

5. The canopy apparatus according to claim 4, wherein the retention assembly comprises a lock pin received by corresponding holes in the lower segment and the intermediate segment.

6. The canopy apparatus according to claim 2, additionally comprising:
    the intermediate segment and the upper segment are joined telescopingly forming a telescoped joint;
    a retention assembly releasably connecting the intermediate segment to the upper segment disabling the intermediate segment and the upper segment from telescoping relative to one another; and
    a compression coupling concurrently circumscribing and securing the telescoped joint from the intermediate segment to the upper segment.

7. The canopy apparatus according to claim 6, wherein the retention assembly comprises a lock pin received by corresponding holes in the intermediate segment and the upper segment.

8. The canopy apparatus according to claim 1, wherein the canopy is mounted to the support assembly for movement between a stowage position juxtaposed with the support assembly and an operative position extending outwardly from the support assembly over the bracket for providing shade or shelter from weather conditions.

9. The canopy apparatus according to claim 8, further comprising a retention assembly for retaining the canopy in the operative position.

10. The canopy apparatus according to claim 9, wherein the retention assembly comprises a lock pin received by corresponding holes in the support assembly and a support member of the canopy.

11. The canopy apparatus according to claim 10, wherein the support member of the canopy interacts with the support assembly when the canopy is in the operative position thereby disabling the canopy from moving beyond the operative position.

12. The canopy apparatus according to claim 11, wherein the support member of the canopy is mounted to the support assembly for movement of the canopy between the stowage position and the operative position.

13. The canopy apparatus according to claim 1, wherein the bracket is configured to be fixed to a seat post of a bicycle, and additionally comprising at least one seat post shim configured to be positioned between the seat post of the bicycle and the bracket.

14. A canopy apparatus, comprising:
- a support assembly comprising a lower segment, an upper segment, and an intermediate segment therebetween connected releasably to both the lower segment and the upper segment, the lower segment extends outwardly from an attached bracket configured to be fixed to a bicycle to the intermediate segment, the intermediate segment extends outwardly from the lower segment and upwardly to the upper segment, and the upper segment extends upwardly from the intermediate segment to an attached canopy over the bracket for providing shade or shelter from the Sun and weather conditions;
- the lower segment and the intermediate segment are joined telescopingly forming a first telescoped joint;
- the intermediate segment and the upper segment are joined telescopingly forming a second telescoped joint;
- a first retention assembly releasably connecting the lower segment to the intermediate segment comprising a first lock pin received by corresponding holes in the lower segment and the intermediate segment disabling the lower segment and the intermediate segment from telescoping relative to one another and a first compression coupling concurrently circumscribing and securing by compression the first telescoped joint while disabling the lower segment and the intermediate segment of the first telescoped joint from rattling against one another; and
- a second retention assembly releasably connecting the intermediate segment to the upper segment comprising a second lock pin received by corresponding holes in the intermediate segment and the upper segment disabling the intermediate segment and the upper segment from telescoping relative to one another and a second compression coupling concurrently circumscribing and securing by compression the second telescoped joint while disabling the intermediate segment and the upper segment of the second telescoped joint from rattling against one another.

15. The canopy apparatus according to claim 14, wherein the canopy is mounted to the upper segment for movement between a stowage position juxtaposed with the support assembly and an operative position extending outwardly from the support assembly over the bracket for providing shade or shelter from weather conditions.

16. The canopy apparatus according to claim 15, further comprising a third retention assembly for retaining the canopy in the operative position.

17. The canopy apparatus according to claim 16, wherein the third retention assembly comprises a lock pin received by corresponding holes in the upper segment and a support member of the canopy.

18. The canopy apparatus according to claim 17, wherein the support member of the canopy interacts with the upper segment when the canopy is in the operative position thereby disabling the canopy from moving beyond the operative position.

19. The canopy apparatus according to claim 18, wherein the support member of the canopy is mounted to the upper segment for movement of the canopy between the stowage position and the operative position.

20. The canopy apparatus according to claim 14, further comprising a caution flag coupled between the canopy and the intermediate segment, the caution flag depends downwardly from the canopy to an intermediate position of the intermediate segment between the lower segment and the upper segment.

21. The canopy apparatus according to claim 14, wherein the bracket is configured to be fixed to a seat post of a bicycle, and additionally comprising at least one seat post shim configured to be positioned between the seat post of the bicycle and the bracket.

* * * * *